(12) United States Patent
Daly et al.

(10) Patent No.: US 8,554,169 B2
(45) Date of Patent: Oct. 8, 2013

(54) COMMERICAL MOBILE ALERT SYSTEM INTERFACE

(75) Inventors: Brian Kevin Daly, Seattle, WA (US); DeWayne Allan Sennett, Redmond, WA (US)

(73) Assignee: AT&T Mobility II LLC, Atlanta, GA (US)

(*) Notice: Subject to any disclaimer, the term of this patent is extended or adjusted under 35 U.S.C. 154(b) by 588 days.

(21) Appl. No.: 12/274,667

(22) Filed: Nov. 20, 2008

(65) Prior Publication Data

US 2010/0009651 A1 Jan. 14, 2010

Related U.S. Application Data

(60) Provisional application No. 61/079,982, filed on Jul. 11, 2008.

(51) Int. Cl.
*H04M 11/04* (2006.01)

(52) U.S. Cl.
USPC .................. 455/404.1; 702/3; 340/539.11

(58) Field of Classification Search
USPC .................. 455/404.1; 702/3; 340/539.16
See application file for complete search history.

(56) References Cited

U.S. PATENT DOCUMENTS

| | | | |
|---|---|---|---|
| 6,112,075 | A | 8/2000 | Weiser |
| 6,745,021 | B1 * | 6/2004 | Stevens ...................... 455/404.1 |
| 7,301,450 | B2 * | 11/2007 | Carrino ...................... 340/539.11 |
| 2002/0004705 | A1 | 1/2002 | Baron et al. |
| 2006/0040639 | A1 | 2/2006 | Karl et al. |
| 2007/0207771 | A1 * | 9/2007 | Bowser et al. ............. 455/404.1 |
| 2007/0296575 | A1 * | 12/2007 | Eisold et al. ............. 340/539.16 |

FOREIGN PATENT DOCUMENTS

EP 1209886 A2 5/2002

OTHER PUBLICATIONS

Commercial Mobile Alert Service Architecture and Requiremrnts draft v0.6 Sep. 24, 2007.*
3GPP TR 22.968 V2.00 (Nov. 2007).*
Http://ftp.tiaonline.org/techcommitee/working/2007may02baltimore/.*
Public Notice, Notice of Appointment of Committee members to the CMASAAVC, retrieved from FCC.gov Dec. 5, 2006.*
FCC First report and order, PS Docket No. 07-287, released Apr. 9, 2008, retrieved from FCC. gov.*
3GPP, "3rd Generation Partnership Project; Technical Specification Group Services and System Aspects; Study for requirements for a Public Warning System (PWS) Service," Jan. 31, 2008, Release 8.

* cited by examiner

*Primary Examiner* — Charles Shedrick
(74) *Attorney, Agent, or Firm* — Woodcock Washburn LLP

(57) ABSTRACT

A system and method for facilitating the distribution of emergency alert messages to electronic devices via a communications network, such as a commercial mobile wireless network. The system includes a commercial mobile service provider (CMSP) gateway that is in communication with an alert gateway and the communications network. The CMSP gateway has a commercial mobile alert system (CMAS) interface, such as an application programming interface (API), that is configured to receive an emergency alert message from the alert gateway. The emergency alert message includes elements that have been mapped from a corresponding emergency alert message that was issued by an alert initiator. The CMAS interface is further configured to process the emergency alert message into a format suitable for distribution to electronic devices that are in communication with the communications network. The emergency alert message is then distributed to the appropriate electronic devices via the communications network.

25 Claims, 10 Drawing Sheets

COMMERICAL MOBILE ALERT SYSTEM INTERFACE

CROSS-REFERENCE TO RELATED APPLICATIONS

This application claims benefit under 35 U.S.C. §119(e) of U.S. Provisional Application No. 61/079,982, filed Jul. 11, 2008, the content of which is incorporated by reference herein in its entirety.

BACKGROUND

The Emergency Alert System (EAS) enables federal, state, and/or local governments to provide timely messages and alerts to the public regarding various types of emergencies. For example, the public may receive messages pertaining to weather conditions, disasters, AMBER alerts (America's Missing: Broadcast Emergency Response), and the like. EAS supersedes the Emergency Broadcast System (EBS), and is jointly administered by the Federal Communications Commission (FCC), the Federal Emergency Management Agency (FEMA), and the National Weather Service (NWS).

EAS alert messages may be issued nationally (i.e., across the entire United States) or within a specific geographic region within the United States. For example, an EAS alert message may be issued for a specific area affected by a natural disaster, such as a hurricane or a flood. The area covered by the alert may span a portion of one or more states, and may cover tens or even hundreds of square miles depending on the type and severity of the emergency.

EAS alert messages are generally communicated to an affected area via radio and television broadcasts. However, other types of communication mediums (e.g., cellular networks, local wireless networks, the Internet, cable networks, etc.) have become more prevalent over the years. In addition, such mediums generally offer advanced capabilities and features, such as targeted advertising and/or messaging. Such features help to ensure that a particular message or communication is delivered to an appropriate audience.

SUMMARY

The disclosed embodiments facilitate the distribution of alert messages via communication networks, such as cellular networks, local wireless networks, the Internet, cable networks, and the like. In particular, one or more of the disclosed embodiments may include a commercial mobile alert system (CMAS) interface that enables communications between an alert gateway and a commercial mobile service provider (CMSP) gateway connected to the communications network.

In one embodiment, the CMAS interface may be an application programming interface (API) that may be executed by the alert gateway, the CMSP gateway, or both. The CMAS interface may enable the alert gateway to process alert messages from one or more alert initiators into a format that can be accommodated by the CMSP gateway. The CMAS interface may also enable the CMSP gateway to process the reformatted messages from the alert gateway into a format that is suitable for distribution to appropriate electronic devices via a commercial wireless network, for example.

In another embodiment, the CMAS interface may enable the alert gateway and the CMSP gateway to exchange various types of messages with one another, such as acknowledgment, "heartbeat," and/or error condition messages.

DETAILED DESCRIPTION OF ILLUSTRATIVE EMBODIMENTS

For purposes of illustration, various embodiments are described herein in connection with the Global System for Mobile Communication (GSM). The references to GSM are not exclusive, however, as it should be appreciated that one or more embodiments may be implemented in connection with any type of wired or wireless access system, such as an intranet, the Internet, a local area network (LAN), a wide area network (WAN), a Public Switched Telephone Network (PSTN), a Code Division Multiple Access (CDMA) network, a Voice Over Internet Protocol (VoIP) network, and the like.

GSM is one of the most widely-used wireless access systems in today's fast growing communication systems. GSM provides circuit-switched data services to subscribers, such as mobile telephone or computer users. General Packet Radio Service (GPRS), which is an extension to GSM technology, introduces packet switching to GSM networks. GPRS uses a packet-based wireless communication technology to transfer high and low-speed data and signaling in an efficient manner. GPRS optimizes the use of network and radio resources, thus enabling the cost effective and efficient use of GSM network resources for packet mode applications.

The disclosed embodiments generally facilitate the distribution of alert messages, such as Emergency Alert System (EAS) messages or Commercial Mobile Alert System (CMAS) messages, via communication networks, such as a GSM wireless network. In particular, the disclosed embodiments may include a CMAS interface that enables communications between an alert gateway and a commercial mobile service provider (CMSP) gateway. The alert gateway and the CMSP gateway may each be connected to the GSM network. The CMAS interface may be an application programming interface (API) that may be executed by the alert gateway and/or the CMSP gateway. The API may be implemented using any suitable messaging protocol, such as Hypertext Transfer Protocol (HTTP) or Transmission Control Protocol (TCP). The API may also be implemented using any suitable mark-up language, such as eXtended Markup Language (XML) or HyperText Markup Language (HTML).

The CMAS interface may enable the alert gateway to process alerts messages from one or more alert initiators into a format that can be accommodated by the CMSP gateway. The CMAS interface may also enable the CMSP gateway to process the reformatted messages from the alert gateway into a format that is suitable for distribution to appropriate electronic devices via a wireless network, for example.

Distribution of Alert Messages

Figure 1:
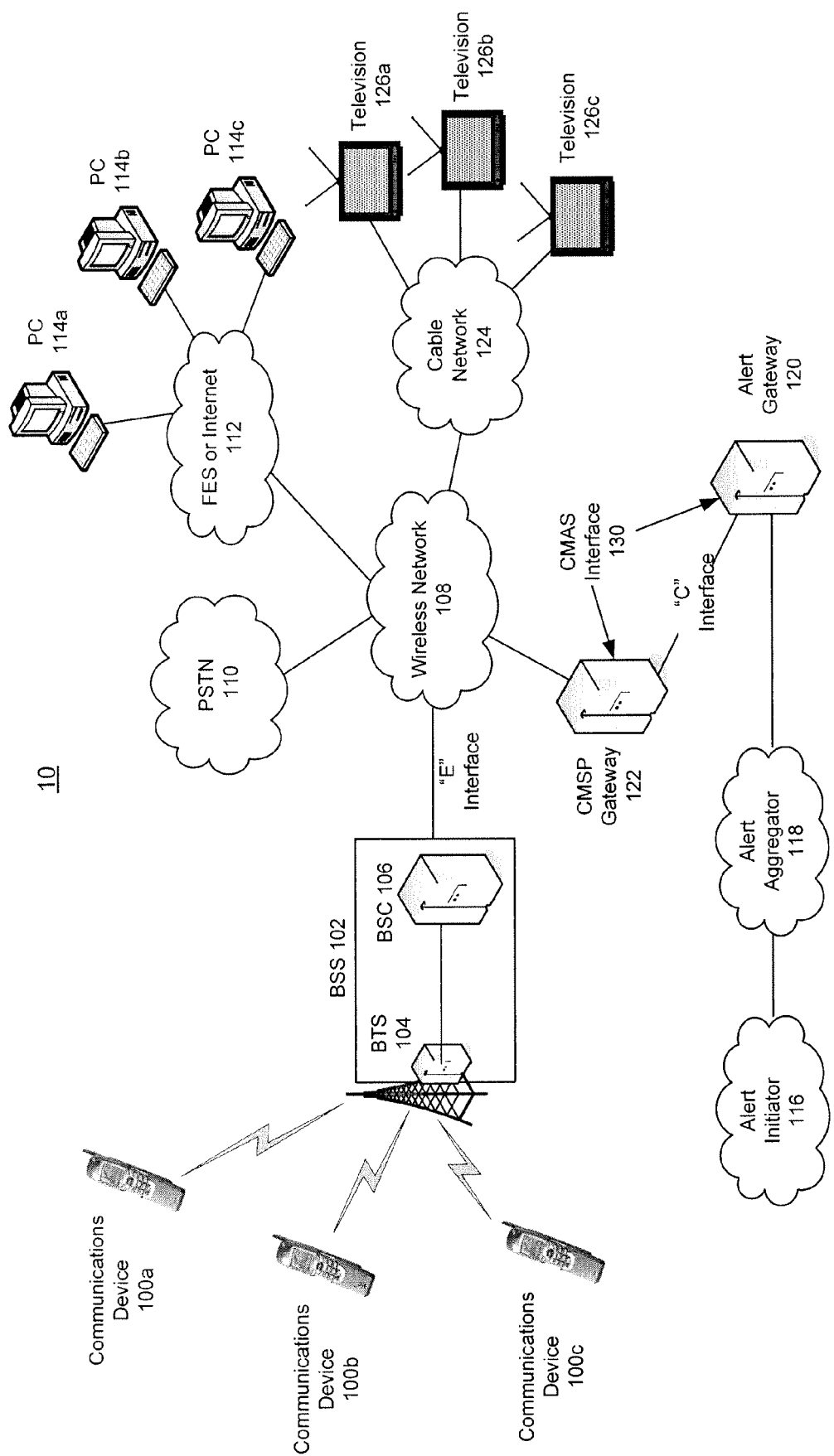
FIG. 1 is a diagram of a system in which aspects of one or more embodiments may be implemented.

FIG. 1 depicts an exemplary system 10 in which aspects of one or more embodiments may be implemented. As shown in FIG. 1, communications devices 100a, 100b, 100c may be in communication with a base station subsystem (BSS) 102, which may include a base transceiver station (BTS) 104 and a base station controller (BSC) 106. The communications devices 100a, 100b, 100c may include various types of mobile communications devices, such as cellular telephones, laptops, personal digital assistants (PDAs), and the like. The BSS 102 may be in communication with a wireless network 108. The wireless network 108 may be in communication with other networks, such as a public switched telephone network (PSTN) 110, a fixed-end system (FES) or Internet 112, and a cable network 124. The Internet 112 and the cable network 124 may be in communication with other types of electronic devices, such as personal computers 114a, 114b, 114c and televisions 126a, 126b, 126c, respectively. The televisions 126a, 126b, 126c may be connected to the cable network 124 via set-top boxes (not shown). Though the Internet 112 and the cable network 124 are depicted as separate, individual networks, it will be appreciated that the two networks may share some or all of the same network components.

The system 10 may be configured to distribute alert messages to various types of electronic devices, such as the communications devices 100a, 100b, 100c, the PCs 114a, 114b, 114c, and/or the televisions 126a, 126b, 126c. To facilitate the distribution of such messages, the wireless network 108 may be in communication with a CMSP gateway 122. The CMSP gateway 122 may be in communication with an alert gateway 120, which may be in communication with an alert aggregator 118. The alert aggregator 118 may be in communication with an alert initiator 116. The CMSP gateway 122 may be part of a private entity, such as a commercial wireless carrier. The alert gateway 120 and the alert aggregator 118 may be part of a public entity, such as the Federal Emergency Management Agency (FEMA). Similarly, the alert initiator 116 may be part of a public entity, such as the National Weather Service (NWS). However, it will be appreciated that the CMSP gateway 122, the alert gateway 120, the alert aggregator 118, and the alert initiator 116 may each be part of a public or private entity.

The CMSP gateway 122 may generally be responsible for providing the interconnection between the alert gateway 120 and the CMSP infrastructure to be used for the broadcast of the CMAS alert message. The alert gateway 120 may generally be responsible for providing the connection point between the alert aggregator 118 functions for federal, state, local, and/or tribal alert initiators 116 and the various commercial service providers.

In an embodiment, an alert message (e.g., a flash flood warning) may be initiated by the alert initiator 116 and sent to the alert aggregator 118. The alert aggregator 118 may evaluate the alert message to determine if and how the alert should be broadcast to the public. If the alert aggregator 118 determines that the alert message should be broadcast to the public, the alert aggregator 118 may pass the alert message to the alert gateway 120. The alert gateway 120 may receive and process the alert message for transmission to the CMSP gateway 122. The CMSP gateway 122 may then receive and process the alert message for distribution to the appropriate electronic devices via the wireless network 108. After receiving the alert message, the electronic devices (e.g., the communications devices 100a, 100b, 100c) may then display the alert message to the corresponding users.

The alert initiator 116 may initiate the alert message using a common alerting protocol (CAP), though it will be appreciated that the alert message may be initiated in any suitable data format. However, the wireless network 108 may not be able to process CAP alerts (or whichever data format is being used by the alert initiator 116). Thus, as noted above, a CMAS interface may be provided between the alert gateway 120 and the CMSP gateway 122 to enable the wireless network 108 to receive and process various types of alert messages that may be initiated by the alert initiator 116. For example, as shown in FIG. 1, the alert gateway 120 and/or the CMSP gateway 122 may include and/or execute a CMAS interface 130, which may be an application programming interface (API) that is implemented by way of an XML program or schema. An exemplary XML schema for the CMAS interface 130 is shown in Appendix I.

The CMAS interface 130 may enable the alert gateway 120 to process the alert message from the alert initiator 116 into another data format, such as a commercial mobile alert C interface (CMAC) message. The alert gateway 120 may then send the CMAC message to the CMSP gateway 122. The CMSP gateway 122 may then process the CMAC message for distribution to the appropriate electronic devices. For example, the CMSP gateway 122 may process the CMAC message into another format (e.g., a commercial mobile alert E interface (CMAE) message) that may be distributed via the wireless network 108 and the BSS 102 to one or more of the communications devices 100a, 100b, 100c. The reformatted message may also be transmitted to the PCs 114a, 114b, 114c and the televisions 126a, 126b, 126c via the Internet 112 and the cable network 124, respectively.

To illustrate an embodiment, the alert initiator 116 (e.g., the NWS) may issue the following CAP alert:

```
<cap:alert xmlns:cap="http://www.incident.com/cap/1.0">
    <cap:identifier>NOAA-NWS-ALERTS Arizona 2007-08-01T18:22:17-
    04:00</cap:identifier>
    <cap:sender>w-nws.webmaster@noaa.gov</cap:sender>
    <cap:sent>2007-08-01T18:22:17-04:00</cap:sent>
    <cap:status>Actual</cap:status>
    <cap:msgType>Alert</cap:msgType>
    <cap:scope>Public</cap:scope>
    <cap:note>Current Watches, Warnings and Advisories for Arizona Issued by the
    National Weather Service</cap:note>
    <cap:references>http://www.weather.gov/alerts/az.html</cap:references>
<cap:info>
    <cap:category>Met</cap:category>
    <cap:event>Flash Flood Warning</cap:event>
    <cap:urgency>Expected</cap:urgency>
```

```
    <cap:severity>Severe</cap:severity>
    <cap:certainty>Likely</cap:certainty>
    <cap:effective>2007-08-01T22:11:00</cap:effective>
    <cap:expires>2007-08-01T23:15:00</cap:expires>
    <cap:headline>Flash Flood Warning</cap:headline>
    <cap:description>FLASH FLOOD WARNING AZC005-012315- BULLETIN -
EAS ACTIVATION REQUESTED FLASH FLOOD WARNING NATIONAL
WEATHER SERVICE FLAGSTAFF AZ 311 PM MST WED AUG 1 2007 THE
NATIONAL WEATHER SERVICE IN FLAGSTAFF HAS ISSUED A * FLASH
FLOOD WARNING FOR . . . SOUTH CENTRAL COCONINO COUNTY IN NORTH
CENTRAL ARIZONA . . . * UNTIL 415 PM MST * AT 306 PM MST . . . NATIONAL
WEATHER SERVICE DOPPLER RADAR INDICATED FLASH FLOODING FROM
A THUNDERSTORM OVER THE WARNED AREA. * LOCATIONS IN THE
WARNING INCLUDE HIGHWAY 89 THROUGH OAK CREEK CANYON
BETWEEN SLIDE ROCK STATE PARK AND MIDGELY BRIDGE. THE HEAVY
RAINS WILL LIKELY TRIGGER LIFE-THREATENING ROCKSLIDES . . .
MUDSLIDES . . . AND DEBRIS FLOWS NEAR THE BRINS FIRE BURN AREA IN
OAK CREEK CANYON . . . AS WELL AS FLOODING OF CREEKS . . . ROADS . . .
AND NORMALLY DRY WASHES. DO NO ATTEMPT TO DRIVE THROUGH THIS
AREA UNTIL THE THREAT HAS DIMINISHED. LAT . . . LON 3488 11177 3489
11169 3499 11169 3498 11177 $$ DB</cap:description>
    <cap:web>http://www.weather.gov/alerts/AZ.html#AZC005.FGZFFWFGZ.221100</cap:web>
    <cap:area>
        <cap:areaDesc>Kaibab Plateau, Marble, Glen Canyons, Grand Canyon Country,
        Coconino Plateau, Northeast Plateaus, Mesas Hwy, Little Colorado River Valley
        in, Western Mogollon Rim, Eastern Mogollon Rim, Oak Creek, Sycamore
        Canyons, Northeast Plateaus, Mesas Sou (Arizona)</cap:areaDesc>
        <cap:geocode>004005</cap:geocode>
    </cap:area>
</cap:info>
</cap:alert>
```

Using the CMAS interface 130, the alert gateway 120 may construct a CMAC message from the CAP alert as follows:

```
<?xml version = "1.0" encoding = "UTF-8"?>
<CMAC_alert xmlns = "urn:xxx:xxx:xx:xxx:cmac:1.0">
    <CMAC_protocol_version>1.0</ CMAC_protocol_version >
    <CMAC_sending_alert_gateway_id>http://cmas_alert_gateway.gov</
            CMAC_sending_alert_gateway_id >
    <CMAC_message_identifier>1056</CMAC_message_identifier>
    <CMAC_sender> w-nws.webmaster@noaa.gov </CMAC_sender>
    <CMAC_sent_date_time>2003-06-17T14:57:00-07:00</CMAC_sent_date_time>
    <CMAC_status>Actual</CMACstatus>
    <CMAC_message_type>Alert</CMAC_message_type>
    <CMAC_alert_info>
        <CMAC_category>Met</CMAC_category>
        <CMAC_severity>Severe</CMAC_severity>
        <CMAC_urgency>Expected</CMAC_urgency>
        <CMAC_certainty>Likely</CMAC_certainty>
        <CMAC_expires_date_time>2007-08-
            01T23:15:00</CMAC_expires_date_time>
        <CMAC_text_language>English</ CMAC_text_language >
        <CMAC_text_encoding>ISO-6739-2</ CMAC_text_encoding>
        <CMAC_text_message_length>75</ CMAC_text_message_length>
        <CMAC_message>Severe Weather Warning until 4:15pm MST National
            Weather Service Flagstaff</ CMAC_message>
        <CMAC_area>
            <CMAC_area_description>Kaibab Plateau, Marble, Glen
            Canyons, Grand Canyon Country, Coconino Plateau, Northeast
            Plateaus, Mesas Hwy, Little Colorado River Valley in, Western
            Mogollon Rim, Eastern Mogollon Rim, Oak Creek, Sycamore
            Canyons, Northeast Plateaus, Mesas Sou
            (Arizona)</CMAC_area_description>
            <CMAC_geocode>004005</CMAC_geocode>
        </CMAC_area>
    </CMAC_alert_info>
</CMAC_alert>
```

After receiving the CMAC message from the alert gateway 120, the CMSP gateway 122 may process the CMAC message (e.g., format the CMAC message into a CMAE message) so that it may be distributed via the wireless network 108 and received by the appropriate electronic devices. Thus, continuing with the foregoing example, the CMSP gateway 122 may send the CMAE message to the wireless network 108 for broadcast to the communications devices 100a, 100b, 100c as "Severe Weather Warning until 4:15 pm MST National Weather Service Flagstaff."

Figure 2:
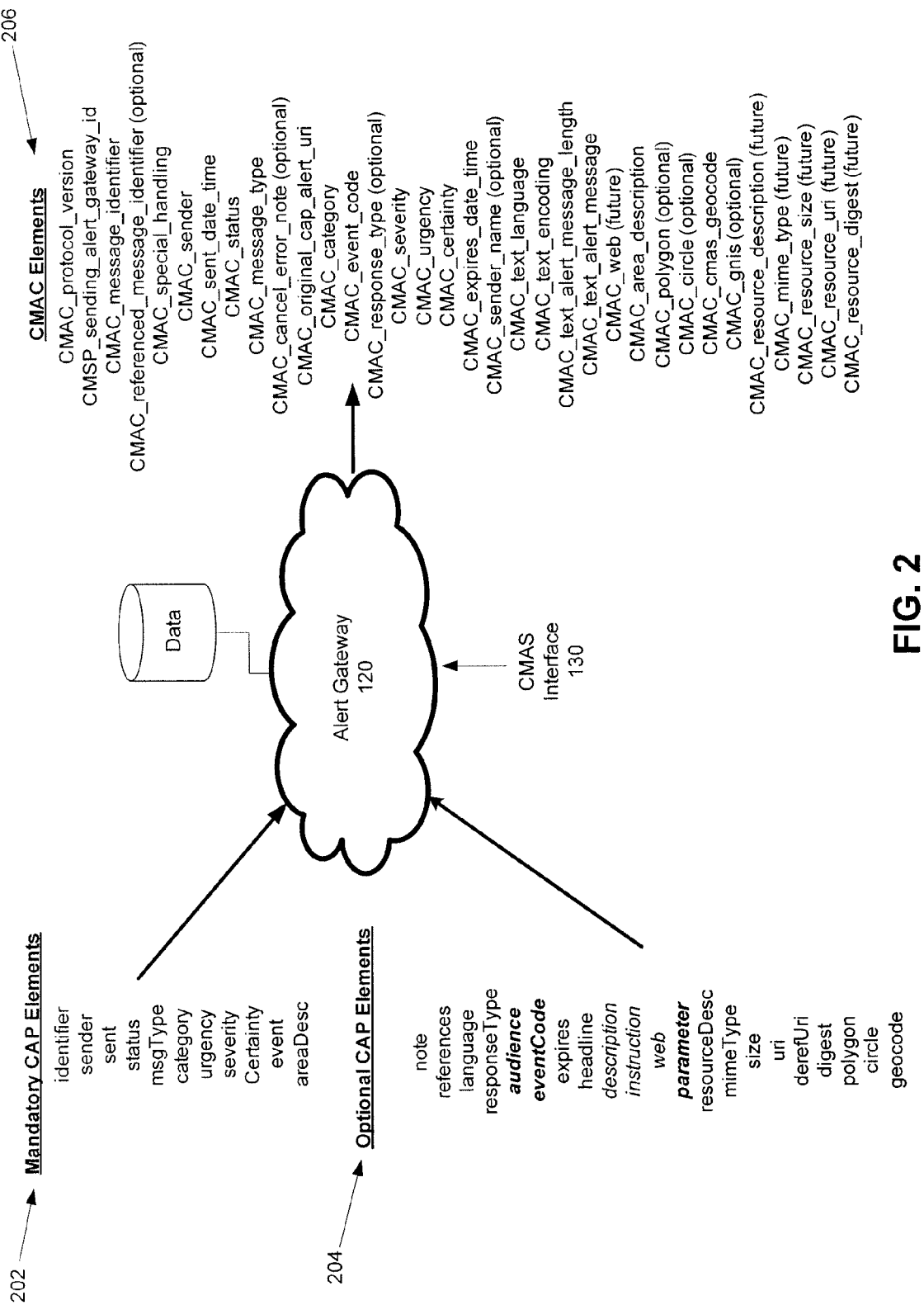
FIG. 2 is a diagram of a process for mapping common alerting protocol (CAP) elements to commercial mobile alert C interface (CMAC) elements.

The CAP alert and the CMAC message may each have a number of elements. For example, as shown in FIG. 2, the CAP alert may include one or more mandatory elements 202 and one or more optional elements 204. The CMAC message may have one or more CMAC elements 206. Thus, the CMAS interface 130 may map the CAP alert's mandatory elements 202 and optional elements 204 into the CMAC elements 206. It will be appreciated that, in other embodiments, some or all of the mandatory elements 202 shown in FIG. 2 may be designated as optional elements 204, and some or all of the optional CAP elements may be designated as mandatory elements 202.

Figure 3:
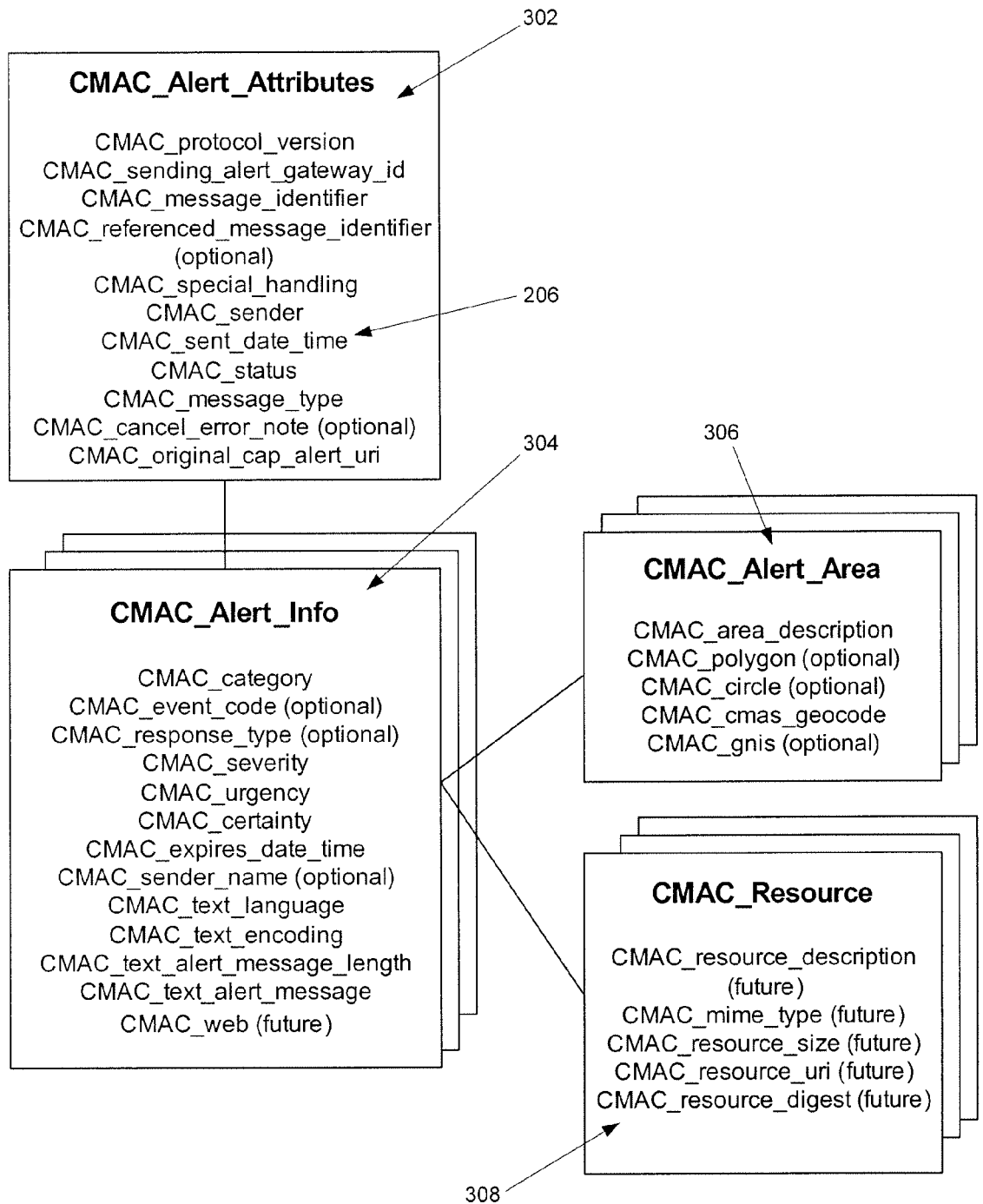
FIG. 3 is a diagram of an exemplary object model of CMAC alert segments and CMAC alert elements.

Each CMAC message may also define a number of segments. For example, each CMAC message may include a CMAC alert attributes segment 302, a CMAC alert information segment 304, a CMAC alert area segment 306, and a CMAC alert resource segment 308. Each of the CMAC elements 206 may be associated with at least one of the CMAC alert segments 302, 304, 306, 308. FIG. 3 depicts an exemplary object model of the CMAC alert segments 302, 304, 306, 308 and CMAC elements 206. In a preferred embodiment, the CMAC message may include one CMAC alert attributes segment 302, one or more CMAC alert information segments 304, and one or more CMAC alert area segments 306. In the preferred embodiment, the CMAC resource segment 308 may be optional, and may be reserved for future use in streaming audio, streaming video, and/or multimedia commercial mobile alerts (CMAs).

While multiple CMAC alert information segments 304 may be included within the CAP alert from the alert initiator 116, each CMAC alert information segment 304 may be a separate commercial mobile alert message (CMAM) from the alert gateway 120. Thus, each CMAC alert information segment 304 may be sent as a separate CMAM with a unique message identifier. In addition, a separate CMAC alert information segment 304 with associated CMAC elements 206 may be created for the CMA messages to be given to commercial wireless providers for broadcast via the CMSP selected technologies consistent with the regulatory requirements and procedures.

The CMAC elements 206 associated with the CMAC alert segments 302, 304, 306, 308 may be defined in any suitable manner. Appendix II lists an exemplary scheme for mapping CAP elements to CMAC elements, and CMAC elements to CMAE elements. Tables I-IV below list exemplary definitions of the CMAC alert elements 206 within each of the CMAC alert segments 302, 304, 306, 308.

TABLE I

CMAC Alert Attributes Segment 302

| CMAC Element | Mandatory/ Optional/ Conditional | CMAC Definition |
|---|---|---|
| CMAC_Alert_Attributes | M | (1) Surrounds CMAC alert segment sub-elements.<br>(2) May include the xmlns attribute referencing the CMAC URN as the namespace, e.g.:<br><cmac:CMAC_alert xmlns:cmac="urn:xxx:xxxxx:xx:cmac:1.0"><br>[sub-elements]<br></cmac:CMAC_alert><br>(3) In addition to the specified subelements, may include one or more <CMAC_alert_info> blocks. |
| CMAC_protocol_version | M | The version of the CMAC protocol. Used by the CMSP Gateway and the Alert Gateway to identify the protocol version of the CMAC protocol. |
| CMAC_sending_alert_gateway_id | M | URI or IP address of the Alert Gateway sending the CMAC message, or the CMSP Gateway in a responses. |
| CMAC_message_identifier | M | A 2-octet binary value uniquely identifying this message assigned by the Alert Gateway and may be derived from the CAP identifier element for Alert Gateway-initiated messages, and assigned by the CMSP Gateway for messages initiated at the CMSP Gateway. This element is sent to the mobile device for Alert, Update and Cancel messages. |
| CMAC_referenced_message_identifier | C | A 2-octet binary value uniquely identifying a referenced CMAM, assigned by the Alert Gateway. May be used for an Update, Cancel or Ack CMAC_message_type. This element may be derived from the CAP references element. |
| CMAC_special_handling | O | Specifies if this alert message requires special handling. May be specified by the Alert Gateway, and may be derived from CAP elements.<br>Exemplary Code Values:<br>"Presidential"<br>"Child Abduction"<br>"No Special Handling" |

TABLE I-continued

CMAC Alert Attributes Segment 302

| CMAC Element | Mandatory/ Optional/ Conditional | CMAC Definition |
|---|---|---|
| CMAC_sender | C | Identifies the originator of this alert. May be used by the CMSP for logging purposes only. May be used for Alert, Update and Cancel CMAC message types. Alert Gateway may use the CAP sender element to populate this element. |
| CMAC_sent_date_time | M | The date and time the message is sent by originator in UTC in XML dateTime format. For Alert, Update and Cancel messages, this element may be derived from the CAP sent element. For other message types, the originating Gateway may set the value to the date and time the message is initiated. |
| CMAC_status | M | This element may be used to identify actual alert messages from exercise and test messages, or from messages used for internal system usse only. The Alert Gateway may use the CAP status element to populate this element.<br>Exemplary Code Values:<br>"Actual" - Actionable by all targeted recipients<br>"Exercise"- Actionable only by designated exercise participants, for CMSP use.<br>"System" - For messages that support alert network internal functions. In addition this is used for the "keep alive" message between the Alert Gateway and the CMSP Gateway.<br>"Test" - Technical testing of the Reference Point "C" interface only, for CMSP Gateway use only. |
| CMAC_message_type | M | This element identifies the message type. For an Alert, Update, or Cancel, the Alert Gateway may use the CAP msgType element to populate this element. This element is also used to identify response messages and keep alive messages.<br>Exemplary Code Values:<br>"Alert" - Initial information requiring attention by targeted recipients<br>"Update" - Updates and supersedes the earlier message(s) identified in <CMAC_referenced_message_identifier><br>"Cancel" - Cancels the earlier message(s) identified in <CMAC_referenced_message_identifier><br>"Ack" - Acknowledges receipt and acceptance of the message(s) identified in <CMAC_referenced_message_identifier> additional explanation may appear in <CMAC_note><br>"Error" indicates rejection of the message(s) identified in <CMAC_referenced_message_identifier>; explanation SHOULD appear in <CMAC_note><br>"Heartbeat" indicates a "keep alive" message periodically sent by the Alert Gateway to verify the availability of the CMSP Gateway |
| CMAC_note | O | Optional element. If present in an message from the Alert Gateway, this element may be used for CMSP logging purposes for a cancel or error message type, or to provide a response back to the Alert Gateway. The Alert Gateway may use the CAP note element to populate this element on messages from the Alert Gateway to the CMSP Gateway. The CMSP Gateway may use this element on response messages to the Alert Gateway. |

TABLE I-continued

CMAC Alert Attributes Segment 302

| CMAC Element | Mandatory/ Optional/ Conditional | CMAC Definition |
| --- | --- | --- |
| CMAC_original_cap_alert_uri | C | This element may include the uri where the CMSP may retrieve the original complete CAP version of the alert from the Alert Gateway. May be used for Alert, Update and Cancel CMAC message types. Specified by the Alert Gateway. |

TABLE II

CMAC Alert Information Segment 304

| CMAC Element | Mandatory/ Optional/ Conditional | CMAC Definition |
| --- | --- | --- |
| CMAC_Alert_Info | M | (1) Surrounds CMAC alert info segment sub-elements (2) Only a single occurrence may be permitted within a single <CMAC_alert>. If there are multiple "info" segments in the original CAP message, the Alert Gateway may format as separate CMAC messages each with a unique identifier. (3) In addition to the specified subelements, may contain one or more <CMAC_resource> blocks and/or one or more <CMAC_alert_area> blocks. |
| CMAC_category | M | Alert Gateway uses the CAP category element to populate this element. Exemplary Code Values used by CMSP Gateway: "Geo" - Geophysical (inc. landslide) "Met" - Meteorological (inc. flood) "Safety" - General emergency and public safety "Security" - Law enforcement, military, homeland and local/private security "Rescue" - Rescue and recovery "Fire" - Fire suppression and rescue "Health" - Medical and public health "Env" - Pollution and other environmental "Transport" - Public and private transportation "Infra" - Utility, telecommunication, other non-transport infrastructure "CBRNE" - Chemical, Biological, Radiological, Nuclear or High-Yield Explosive threat or attack "Other" - Other events Multiple instances may occur within a single <CMAC_info> block. This element is passed to the mobile device. |
| CMAC_event_code | O | Alert Gateway may use the CAP eventCode element to populate this element. Optional element may be used by the CMSP Gateway. An exemplary system-specific code for event typing, in the form: <CMAC_event_code> <CMAC_valueName>valueName</CMAC_valueName> <CMAC_value>value</CMAC_value> </CMAC_event_code> where the content of "CMAC_valueName" is a user assigned string designating the domain of the code, and the content of "value" is a string (which may represent a number) denoting the value itself (e.g., CMAC_valueName = "SAME" and value = "TOR"). |

TABLE II-continued

CMAC Alert Information Segment 304

| CMAC Element | Mandatory/ Optional/ Conditional | CMAC Definition |
|---|---|---|
| | | Values of "CMAC_valueName" that are acronyms may be represented in all capital letters without periods (e.g., SAME). Multiple instances may occur within a single <CMAC_info> block. This element is passed to the mobile device. The following exemplary SAME codes are supported in CMAS: Civil Danger Warning CDW Civil Emergency Message CEM Evacuation Immediate EVI Hazardous Materials Warning HMW Law Enforcement Warning LEW Local Area Emergency LAE Nuclear Power Plant Warning NUW Radiological Hazard Warning RHW Shelter in Place Warning SPW Avalanche Warning AVW Blizzard Warning BZW Child Abduction Emergency CAE Coastal Flood Warning CFW Dust Storm Warning DSW Earthquake Warning EQW Fire Warning FRW Flash Flood Warning FFW Flood Warning FLW High Wind Warning HWW Hurricane Warning HUW Severe Thunderstorm Warning SVR Special Marine Warning SMW Tornado Warning TOR Tropical Storm Warning TRW Tsunami Warning TSW Volcano Warning VOW Winter Storm Warning WSW |
| CMAC_response_type | O | Alert Gateway may use the CAP responseType element to populate this element. Exemplary code values: "Shelter" - Take shelter in place "Evacuate" - Relocate "Prepare" - Make preparations "Execute" - Execute a pre planned activity "Monitor" - Attend to information sources "Assess" - Evaluate the information in this message. (This value SHOULD NOT be used in public warning applications.) "None" - No action recommended Multiple instances may occur within a single <CMAC_info> block. This element is passed to the mobile device. |
| CMAC_severity | M | Alert Gateway uses the CAP severity element to populate this element. Exemplary Code Values sent to the mobile device: "Extreme" - Extraordinary threat to life or property "Severe" - Significant threat to life or property |
| CMAC_urgency | M | Alert Gateway uses the CAP urgency element to populate this element. Exemplary Code Values sent to the mobile device: "Immediate" - Responsive action should be taken immediately "Expected" - Responsive action should be taken soon (within next hour) |

TABLE II-continued

CMAC Alert Information Segment 304

| CMAC Element | Mandatory/ Optional/ Conditional | CMAC Definition |
|---|---|---|
| CMAC_certainty | M | Alert Gateway uses the CAP certainty element to populate this element. Exemplary Code Values sent to the mobile device: "Observed" - Determined to have occurred or to be ongoing. "Likely" - Likely (probability > ~50%) |
| CMAC_expires_date_time | M | The expiry time of the information of the alert message for use by the CMSP Gateway. The date and time is represented in UTC [dateTime] format. Derived from the CAP expires element. |
| CMAC_sender_name | O | Optional element for logging purposes at the CMSP Gateway. The human-readable name of the agency or authority issuing this alert. Alert Gateway uses the CAP senderName element to populate this element. |
| CMAC_text_language | M | Specifies the language of the text in the CMAC_text_alert_message, for use by the mobile device. Exemplary Code Values: "English" "Spanish" "French" (future Canada use only) "Other" - for future use May be specified by the Alert Gateway and derived from the CAP language element. |
| CMAC_text_encoding | M | Specifies the data encoding scheme of the text in the CMAC_text_alert_message, for use by the mobile device. Exemplary Code Values: "GSM-7 bit" "ISO-639-2" "UCS-2" "UTF-16" Note: the CMSP profile in the Alert Gateway will specify which language(s) and character encoding is supported. May be specified by the Alert Gateway. |
| CMAC_text_alert_message_length | M | The length, in characters, of the text in the CMAC_text_alert_message. Note the number of octets in the CMAC_text_alert_message can be derived from this parameter and the CMAC_text_encoding parameter. Specified by the Alert Gateway. |
| CMAC_text_alert_message | M | The text of the alert message for use by the mobile device. This field is defined by the CMAS Text Profile and may contain up to 90 English characters using a 7-bit encoding scheme. Other languages or data encoding schemes may change the number of characters supported. May be specified by the Alert Gateway, which may be derived or obtained via CAP elements. |
| CMAC_web_link | O | Optional element for future use. The identifier of the hyperlink associating additional information with the alert message. This data may be in a domain accessible by the CMSP Gateway. Alert Gateway uses the CAP web element to populate this element. |

TABLE III

CMAC Alert Area Segment 306

| CMAC Element | Mandatory/ Optional/ Conditional | CMAC Definition |
|---|---|---|
| CMAC_Alert_Area | M | (1) Surrounds CMAC alert area segment sub-elements (2) Multiple occurrences permitted, in which case the target area for the <CMAC_alert_info> block is the union of all the included <CMAC_alert_area> blocks. (3) May include one or multiple instances of <CMAC_polygon> or <CMAC_circle>, and shall contain at least one instance of <CMAC_geocode>. If multiple <CMAC_polygon>, <CMAC_circle> or <CMAC_geocode> elements are included, the area described by this <area> is the union of those represented by the included elements. |
| CMAC_area_description | M | The text describing the affected area of the alert message for use by the CMSP for logging purposes only. Alert Gateway may use the CAP areaDesc element to populate this element. |
| CMAC_polygon | O | Optional element. The paired values of points defining a polygon that delineates the affected area of the alert message. Alert Gateway may use the CAP polygon element to populate this element. |
| CMAC_circle | O | Optional element. The paired values of a point and radius delineating the affected area of the alert message. Alert Gateway may use the CAP circle element to populate this element. |
| CMAC_cmas_geocode | M | The CMAS-defined geographic code delineating the affected area of the alert message. This is an extension to the FIPS code (see section 11.3.5). Alert Gateway may use the CAP geocode, polygon, circle, and/or sender elements to derive this element. |
| CMSC_gnis | O | Optional element. This value is the geographic code delineating the affected area of the alert message using the U.S.G.S. Geographic Names Information System (GNIS) code. Derived by the Alert Gateway. |

TABLE IV

CMAC Resource Segment 308

| CMAC Element | Mandatory/ Optional/ Conditional | CMAC Definition |
|---|---|---|
| CMAC_resource | O | (1) Refers to an additional file with supplemental information related to this <CMAC_alert_info> element; e.g., an image or audio file (2) Multiple occurrences may occur within a single <CMAC_alert_info> block |
| CMAC_resource_description | O | Optional element. The human-readable text describing the content and kind, such as "map" or "photo," of the resource file. For use by the CMSP Gateway for logging purposes only. Alert Gateway may use the CAP resourceDesc element to populate this element. |
| CMAC_mime_type | O | Optional element. The identifier of the MIME content type and sub-type describing the resource file. Alert Gateway may use the CAP mimeType element to populate this element. |
| CMAC_resource_size | O | Optional element. The integer indicating the size of the resource file. Alert Gateway may use the CAP size element to populate this element. |
| CMAC_resource_uri | O | Optional element. The identifier of the hyperlinik for the resource file. Alert Gateway may use the CAP uri element to populate this element. |

TABLE IV-continued

CMAC Resource Segment 308

| CMAC Element | Mandatory/ Optional/ Conditional | CMAC Definition |
|---|---|---|
| CMAC_digest | O | Optional element. The code representing the digital digest ("hash") computed from the resource file. Calculated using the Secure Hash Algorithm (SHA-1) per [FIPS 180-2]. Alert Gateway may use the CAP digest element to populate this element. |

The CMAC_cmas_geocode element (defined above in Table III) associated with the CMAC alert area segment 306 may include five characters. The first two characters may identify the state or region associated with the particular CMAC message. The last three characters may identify the specific counties, regions, or equivalent entities.

For example, the CMAC_cmas_geocode indication for a specific county may be defined in accordance with the Federal Information Processing Standard 6-4 (FIPS 6-4), entitled "Counties and Equivalent Entities of the United States, Its Possessions, and Associated Areas," dated Aug. 31, 1990, the content of which is incorporated by reference herein. The CMAC_cmas_geocode indication for an entire state may be the two digit FIPS State Numeric Code as defined in Federal Information Processing Standard 5-2 (FIPS 5-2), entitled "Codes for the Identification of the States, the District of Columbia and the Outlying Areas of the United States, and Associated Areas," dated May 28, 1987, the content of which is incorporated by reference herein, followed by three zeroes (000). The CMAC_cmas_geocode indication for the entire United States, including all states, the District of Columbia, possessions, and associated areas, may be US000. It will be appreciated that alerts may be targeted for specific regions of the United States (e.g., the Gulf States). Thus, the CMAC_cmas_geocode may include values for regional areas, such as FEMA regions or NWS regions. The FEMA regions may be assigned values in the format of US0xx and the NWS regions may be assigned values in the format of US1xx. Table V below lists exemplary definitions of assigned CMAC_cmas_geocode values.

TABLE V

Exemplary definitions of CMAC_cmas_geocode values

| CMAC_cmas geocode | Definition |
|---|---|
| 00000 | Not Used |
| 00001 thru 99999 | For Identification of states and counties |
| US000 | Entire United States |
| US001 | FEMA Region 1 (Maine, Vermont, New Hampshire, Rhode Island, Massachusetts, and Connecticut) |
| US002 | FEMA Region 2 (New York, New Jersey, Puerto Rico, and Virgin Islands) |
| US003 | FEMA Region 3 (Delaware, District of Columbia, Maryland, Pennsylvania, Virginia, and West Virginia) |
| US004 | FEMA Region 4 (Alabama, Florida, Georgia, North Carolina, South Carolina, Tennessee, Kentucky, and Mississippi) |
| US005 | FEMA Region 5 (Illinois, Indiana, Michigan, Minnesota, Ohio, and Wisconsin) |
| US006 | FEMA Region 6 (Arkansas, Louisiana, New Mexico, Oklahoma, and Texas) |
| US007 | FEMA Region 7 (Iowa, Kansas, Missouri, and Nebraska) |
| US008 | FEMA Region 8 (Colorado, Montana, North Dakota, South Dakota, and Utah) |
| US009 | FEMA Region 9 (Arizona, California, Hawaii, Nevada, American Samoa, Guam, Commonwealth of the Northern Mariana Islands, Republic of the Marshall Islands, and Federated States of Micronesia) |
| US010 | FEMA Region 10 (Alaska, Idaho, Oregon, and Washington) |
| US011 thru US100 | Not Assigned |
| US101 | National Weather Service (NWS) Central Region (Colorado, Illinois, Indiana, Iowa, Kansas, Kentucky, Michigan, Minnesota, Missouri, and Nebraska) |
| US102 | National Weather Service (NWS) Eastern Region (Maine, Maryland, Massachusetts, New Jersey, New York, North Carolina, Ohio, Pennsylvania, South Carolina, and Vermont) |
| US103 | National Weather Service (NWS) Southern Region (Alabama, Arkansas, Florida, Georgia, Louisiana, Mississippi, New Mexico, Oklahoma, Puerto Rico, Tennessee, and Texas) |

TABLE V-continued

Exemplary definitions of CMAC_cmas_geocode values

| CMAC_cmas geocode | Definition |
| --- | --- |
| US104 | National Weather Service (NWS) Western Region (Arizona, California, Idaho, Montana, Nevada, Oregon, Utah, and Washington) |
| US105 | National Weather Service (NWS) Alaska Region (Alaska) |
| US106 | National Weather Service (NWS) Pacific Region (Hawaii, Guam, America Samoa) |
| US107 thru US999 | Not Assigned |

Messaging Between the Alert Gateway and the CMSP Gateway

The CMAS interface 130 may provide other features and/or functionality for facilitating communications between the alert gateway 120 and the CMSP gateway 122. For example, the CMAS interface 130 may enable the alert gateway 120 to periodically issue a keep alive (e.g., a "heartbeat") message to the CMSP gateway 122. The keep alive message may be used by the alert gateway 120 to check on the status of the CMSP gateway 122. In an embodiment, the keep alive message may be a CMAC message that only includes the CMAC alert attributes segment 302. The keep alive message may be indicated by a CMAC_status element value of "System" and a CMAC_message_type element value of "Heartbeat." The alert gateway 120 may indicate the time the message was initiated in the CMAC_sent_date_time element. The alert gateway 120 may assign a unique message identifier to the keep alive message, specified in the CMAC_message_identifier element, to send "heartbeat" messages to the CMSP gateway 122. Table VI below summarizes the particular CMAC elements 206 that may be used for an alert gateway-initiated keep alive message.

TABLE VI

| CMAC Element | Value |
| --- | --- |
| CMAC_protocol_version | Version of the CMAC protocol |
| CMAC_sending_alert_gateway_id | Alert Gateway identifier |
| CMAC_message_identifier | Unique message identifier assigned by the Alert Gateway |
| CMAC_sent_date_time | Date and time the Keep Alive message is sent by the Alert Gateway |
| CMAC_status | Value of "System" |
| CMAC_message_type | Value of "Heartbeat" |

The following is an exemplary format for a keep alive message initiated from the alert gateway 120 and sent to the CMSP gateway 122:

```
<?xml version = "1.0" encoding = "UTF-8"?>
<CMAS_Alert_Attributes xmlns = "urn:xxx:xxx:xx:xxx:cmac:1.0">
    <CMAC_protocol_version>1.0</CMAC_protocol_version>
<CMAC_sending_alert_gateway_id>http://cmas_federal_alert_gateway_uri
    </CMAC_sending_alert_gateway_id >
    <CMAC_message_identifier>1056</CMAC_message_identifier>
    <CMAC_sent_date_time>2008-06-25T14:50:00-07:00</CMAC_sent_date_time>
    <CMAC_status>System</CMAC_status>
    <CMAC_message_type>Heartbeat</CMAC_message_type>
</CMAC_Alert_Attributes>
```

Upon receipt of the alert gateway-initiated keep alive message, the CMSP gateway 122 may send an acknowledgement of successful receipt or indicate an error condition. In an embodiment, the keep alive acknowledgement may be a CMAC message that only includes the CMAC alert attributes segment 302. A successful keep alive acknowledgement may be indicated by a CMAC_status element value of "System," a CMAC_message_type element value of "Ack," and a CMAC Response Code 502 in the CMAC_note element. The CMSP gateway 122 may indicate the time the message was acknowledged in the CMAC_sent_date_time element. The CMSP gateway 122 may use the same message identifier in the acknowledgment as was specified in the CMAC_message_identifier element of the received keep alive message. Table VII below summarizes the particular CMAC elements 206 that may be used for a CMSP gateway acknowledgement of an alert gateway-initiated keep alive message.

TABLE VII

| CMAC Element | Value |
| --- | --- |
| CMAC_protocol_version | Version of the CMAC protocol |
| CMAC_sending_alert_gateway_id | CMSP Gateway identifier |
| CMAC_message_identifier | The identifier value contained in the Keep Alive message received from the Alert Gateway which is being acknowledged |
| CMAC_sent_date_time | Date and time the Keep Alive message was acknowledged by the CMSP Gateway |
| CMAC_status | Value of "System" |
| CMAC_message_type | Value of "Ack" |
| CMAC_note | Value of "CMAC_Resp_502" |

The following is an exemplary format of a CMSP keep alive acknowledgement message from the CMSP gateway 122 to the alert gateway 120:

```
<?xml version = "1.0" encoding = "UTF-8"?>
<CMAS_Alert_Attributes xmlns = "urn:xxx:xxx:xx:xxx:cmac:1.0">
    <CMAC_protocol_version>1.0</CMAC_protocol_version>
<CMAC_sending_alert_gateway_id>http://cmas_cmsp_gateway_uri
    </CMAC_sending_alert_gateway_id >
    <CMAC_message_identifier>1056</CMAC_message_identifier>
    <CMAC_sent_date_time>2008-06-25T14:50:05-07:00</CMAC_sent_date_time>
    <CMAC_status>System</CMAC_status>
    <CMAC_message_type>Ack</CMAC_message_type>
    <CMAC_note>CMAC_Resp_502</CMAC_note>
</CMAC_Alert_Attributes>
```

The CMSP gateway 122 may also indicate an error condition as a result of receiving an alert gateway-initiated keep alive message. An error condition may be indicated by the CMAC_message_type element including "Error" and with one or more CMAC response codes in the CMAC_note element. The remaining fields may include the values specified in the acknowledgment. Table VIII below summarizes the particular CMAC elements 206 that may be used for a CMSP gateway error indication of an alert gateway-initiated keep alive message.

TABLE VIII

| CMAC Element | Value |
| --- | --- |
| CMAC_protocol_version | Version of the CMAC protocol |
| CMAC_sending_alert_gateway_id | CMSP Gateway identifier |
| CMAC_message_identifier | The identifier value contained in the Keep Alive message received from the Alert Gateway which is being acknowledged |
| CMAC_sent_date_time | Date and time the Keep Alive message was acknowledged by the CMSP Gateway |
| CMAC_status | Value of "System" |
| CMAC_message_type | Value of "Error" |
| CMAC_note | The Alert Gateway may populate this element on messages from the Alert Gateway to the CMSP Gateway, and the CMSP Gateway may use this element on response messages to the Alert Gateway. |

The following is exemplary format of a keep alive error message, with multiple error conditions reported, sent from the CMSP gateway 122 to the alert gateway 120:

```
<?xml version = "1.0" encoding = "UTF-8"?>
<CMAS_Alert_Attributes xmlns = "urn:xxx:xxx:xx:xxx:cmac:1.0">
    <CMAC_protocol_version>1.0</CMAC_protocol_version>
<CMAC_sending_alert_gateway_id>http://cmas_cmsp_gateway_uri
    </CMAC_sending_alert_gateway_id >
    <CMAC_message_identifier>1056</CMAC_message_identifier>
    <CMAC_sent_date_time>2008-06-
    25T14:50:05-07:00</CMAC_sent_date_time>
    <CMAC_status>System</CMAC_status>
    <CMAC_message_type>Error</CMAC_message_type>
    <CMAC_note>CMAC_Resp_500,
    CMAC_Error_300</CMAC_note>
</CMAC_Alert_Attributes>
```

The CMSP gateway 122 may use the foregoing message to request that the alert gateway 120 discontinue transmission of alert messages, and to indicate that there is insufficient storage on the CMSP gateway 122.

In another embodiment, the CMAS interface 130 may enable the CMSP gateway 122 to acknowledge receipt of a CMAC alert, update, or cancel message from the alert gateway 120. More specifically, upon receipt and validation of the CMAC alert, update, or cancel message, the CMSP gateway 122 may send an acknowledgement to the alert gateway 120 from which the CMSP gateway 122 received the message. In an embodiment, the acknowledgement from the CMSP gateway 122 may be a CMAC message that only includes a CMAC alert attributes segment 302. In the acknowledgement, the CMSP Gateway may provide an identifier of the CMSP gateway 122 in the CMAC_sending_alert gateway_id element, and indicate the time the message is acknowledged in the CMAC_sent_date_time element. The CMAC_message_identifier may include the identifier of the message that is being acknowledged. The CMAC_status element may indicate that the acknowledgment is a "system" message. Table IX below summarizes the particular CMAC elements 206 that may be used to acknowledge a CMAC alert, update, or cancel message.

TABLE IX

| CMAC Element | Value |
| --- | --- |
| CMAC_protocol_version | Version of the CMAC protocol |
| CMAC_sending_alert_gateway_id | CMSP Gateway identifier |
| CMAC_message_identifier | The identifier value contained in the Alert, Update or Cancel message received from the Alert Gateway which is being acknowledged |
| CMAC_sent_date_time | Date and time the acknowledgement is sent by the CMSP Gateway |
| CMAC_status | Value of "System" |
| CMAC_message_type | Value of "Ack" |

The following is an exemplary format of a CMSP acknowledgment in response to receiving a CMAC alert, update, or cancel message from the alert gateway 120:

```
<?xml version = "1.0" encoding = "UTF-8"?>
<CMAS_Alert_Attributes xmlns = "urn:xxx:xxx:xx:xxx:cmac:1.0">
    <CMAC_protocol_version>1.0</ CMAC_protocol_version >
    <CMAC_sending_alert_gateway_id>http://cmas_alert_gateway.gov</
        CMAC_sending_alert_gateway_id >
    <CMAC_message_identifier>1056</CMAC_message_identifier>
    <CMAS_sender> w-nws.webmaster@noaa.gov </CMAS_sender>
    <CMAC_sent_date_time>2003-06-17T14:57:00-07:00</CMAC_sent_date_time>
    <CMAC_status>Actual</CMACstatus>
    <CMAC_message_type>Alert</CMAC_message_type>
    <CMAC_original_cap_alert_uri >http://cmas_alert_gateway.gov/CMAM1056
    </CMAC_original_cap_alert_uri >
```

-continued

```
<CMAC_Alert_Info>
    <CMAC_category>Met</CMAC_category>
    <CMAC_severity>Severe</CMAC_severity>
    <CMAC_urgency>Expected</CMAC_urgency>
    <CMAC_certainty>Likely</CMAC_certainty>
    <CMAC_expires_date_time>2007-08-
        01T23:15:00</CMAC_expires_date_time>
    <CMAC_text_language>English</ CMAC_text_language >
    <CMAC_text_encoding>UTF-8</ CMAC_text_encoding>
    <CMAC_text_message_length>56</ CMAC_text_message_length>
    <CMAC_message>Severe Weather Warning in this area until 4:15pm
        MST NWS</ CMAC_message>
<CMAC_Alert_Area>
    <CMAC_area_description>Kaibab Plateau, Marble, Glen Canyons, Grand
    Canyon Country, Coconino Plateau, Northeast Plateaus, Mesas Hwy,
    Little Colorado River Valley in, Western Mogollon Rim, Eastern
    Mogollon Rim, Oak Creek, Sycamore Canyons, Northeast Plateaus, Mesas
    Sou (Arizona)</CMAC_area_description>
    <CMAC_cmas_geocode>004005</CMAC_cmas_geocode>
</CMAC_Alert_Area>
</CMAC_Alert_Info>
</CMAC_Alert_Attributes>
```

In addition to, or in lieu of, providing an acknowledgment to the alert gateway 120, the CMSP gateway 122 may also indicate a received message error or other error condition as a result of receiving an alert gateway-initiated alert, update or cancel message. An error condition may be indicated by the CMAC_message_type element including "Error" with one or more CMAC response codes in the CMAC_note element. The remaining fields may include values as specified in the CMSP acknowledgement. Table X below summarizes the particular CMAC elements 206 that may be used for an error indication of an alert gateway-initiated alert, update or cancel message.

The foregoing example indicates that the CMSP gateway 122 received the alert or update message after the message expiration time.

In addition to acknowledgments and error messages, the CMSP gateway 122 may periodically issue a keep alive (e.g., a "heartbeat") message to the alert gateway 120 via the CMAS interface 130. The CMSP gateway 122 may use the keep alive message to check on the status of the alert gateway 120. In an embodiment, the keep alive message from the CMSP gateway 122 may be a CMAC message that only includes the CMAC alert attributes segment 302. The keep

TABLE X

| CMAC Element | Value |
| --- | --- |
| CMAC_protocol_version | Version of the CMAC protocol |
| CMAC_sending_alert_gateway_id | CMSP Gateway identifier |
| CMAC_message_identifier | The identifier value contained in the Alert, Update or Cancel message received from the Alert Gateway which is being acknowledged |
| CMAC_sent_date_time | Date and time the Alert, Update or Cancel message was acknowledged by the CMSP Gateway |
| CMAC_status | Value of "System" |
| CMAC_message_type | Value of "Error" |
| CMAC_note | The Alert Gateway may populate this element on messages from the Alert Gateway to the CMSP Gateway, and the CMSP Gateway may use this element on response messages to the Alert Gateway. |

The following is an exemplary format of a "keep alive" error message, with multiple error conditions reported, sent from the CMSP gateway 122 to the alert gateway 120:

```
<?xml version = "1.0" encoding = "UTF-8"?>
<CMAS_Alert_Attributes xmlns = "urn:xxx:xxx:xx:xxx:cmac:1.0">
    <CMAC_protocol_version>1.0</CMAC_protocol_version>
<CMAC_sending_alert_gateway_id>http://cmas_cmsp_gateway_uri
    </CMAC_sending_alert_gateway_id >
    <CMAC_message_identifier>1056</CMAC_message_identifier>
    <CMAC_sent_date_time>2008-06-
    25T14:50:05-07:00</CMAC_sent_date_time>
    <CMAC_status>System</CMAC_status>
    <CMAC_message_type>Error</CMAC_message_type>
    <CMAC_note>CMAC_Error_201</CMAC_note>
</CMAC_Alert_Attributes>
``` alive message may be indicated by a CMAC_status element value of "System" and a CMAC_message_type element value of "Heartbeat." The CMSP gateway 122 may indicate the time the message was initiated in the CMAC_sent_date_time element. The CMSP gateway 122 may assign a unique message identifier to the keep alive message that may be specified in the CMAC_message_identifier element. Table XI below summarizes the particular CMAC elements 206 that may be used for a CMSP gateway-initiated keep alive message.

TABLE XI

| CMAC Element | Value |
| --- | --- |
| CMAC_protocol_version | Version of the CMAC protocol |
| CMAC_sending_alert_gateway_id | CMSP Gateway identifier |

TABLE XI-continued

| CMAC Element | Value |
|---|---|
| CMAC_message_identifier | Unique message identifier assigned by the CMSP Gateway |
| CMAC_sent_date_time | Date and time the Keep Alive message is sent by the CMSP Gateway |
| CMAC_status | Value of "System" |
| CMAC_message_type | Value of "Heartbeat" |

The following is an exemplary format for a keep alive message initiated from the CMSP gateway 122 and sent to the alert gateway 120:

```
<?xml version = "1.0" encoding = "UTF-8"?>
<CMAS_Alert_Attributes xmlns = "urn:xxx:xxx:xx:xxx:cmac:1.0">
    <CMAC_protocol_version>1.0</CMAC_protocol_version>
<CMAC_sending_alert_gateway_id>http://cmas_cmsp_gateway_uri
    </CMAC_sending_alert_gateway_id >
    <CMAC_message_identifier>1056</CMAC_message_identifier>
    <CMAC_sent_date_time>2008-06-
    25T14:50:00-07:00</CMAC_sent_date_time>
    <CMAC_status>System</CMAC_status>
    <CMAC_message_type>Heartbeat</CMAC_message_type>
</CMAC_Alert_Attributes>
```

Upon receipt of the CMSP gateway-initiated keep alive message, the alert gateway may send an acknowledgement of successful receipt or indicate an error condition. The keep alive acknowledgement from the alert gateway 120 may be a CMAC message that only includes a CMAC alert attributes segment 302. The keep alive acknowledgement may be indicated by a CMAC_status element value of "System," a CMAC_message_type element value of "Ack," and a CMAC Response Code 502 in the CMAC_note element. The alert gateway 120 may indicate the time the message was acknowledged in the CMAC_sent_date_time element. The alert gateway 120 may use the same message identifier in the acknowledgment as was specified in the CMAC_message_identifier element of the received keep alive message from the CMSP gateway 122. Table XII below summarizes the particular CMAC elements 206 that may be used for an alert gateway acknowledgement of a CMSP gateway-initiated keep alive message.

TABLE XII

| CMAC Element | Value |
|---|---|
| CMAC_protocol_version | Version of the CMAC protocol |
| CMAC_sending_alert_gateway_id | Alert Gateway identifier |
| CMAC_message_identifier | The identifier value contained in the Keep Alive message received from the CMSP Gateway which is being acknowledged |
| CMAC_sent_date_time | Date and time the Keep Alive message was acknowledged by the Alert Gateway |
| CMAC_status | Value of "System" |
| CMAC_message_type | Value of "Ack" |
| CMAC_note | Value of "CMAC_Resp_502" |

The following is an exemplary format of a CMSP keep alive acknowledgement message from the alert gateway to the CMSP gateway 122:

```
<?xml version = "1.0" encoding = "UTF-8"?>
<CMAS_Alert_Attributes xmlns = "urn:xxx:xxx:xx:xxx:cmac:1.0">
    <CMAC_protocol_version>1.0</CMAC_protocol_version>
<CMAC_sending_alert_gateway_id>http://cmas_federal_alert_gateway_uri
    </CMAC_sending_alert_gateway_id >
    <CMAC_message_identifier>1056</CMAC_message_identifier>
    <CMAC_sent_date_time>2008-06-
    25T14:50:05-07:00</CMAC_sent_date_time>
    <CMAC_status>System</CMAC_status>
    <CMAC_message_type>Ack</CMAC_message_type>
    <CMAC_note>CMAC_Resp_502</CMAC_note>
</CMAC_Alert_Attributes>
```

The alert gateway 120 may also indicate an error condition as a result of receiving the CMSP gateway-initiated keep alive message. The error condition may be indicated by the CMAC_message_type element including "Error" and with one or more CMAC Response Codes in the CMAC_note element. The remaining fields may include the values that were specified in the acknowledgement. Table XIII below summarizes the particular CMAC elements 206 that may be used for an alert gateway error indication of a CMSP gateway-initiated keep alive message.

TABLE XIII

| CMAC Element | Value |
|---|---|
| CMAC_protocol_version | Version of the CMAC protocol |
| CMAC_sending_alert_gateway_id | Alert Gateway identifier |
| CMAC_message_identifier | The identifier value contained in the Keep Alive message received from the CMSP Gateway which is being acknowledged |
| CMAC_sent_date_time | Date and time the Keep Alive message was acknowledged by the Alert Gateway |
| CMAC_status | Value of "System" |
| CMAC_message_type | Value of "Error" |
| CMAC_note | One or more CMAC Response Code Values |

The following is an exemplary format of a keep alive error message, with an error condition reported, that may be sent from the alert gateway 120 to the CMSP gateway 122:

```
<?xml version = "1.0" encoding = "UTF-8"?>
<CMAS_Alert_Attributes xmlns = "urn:xxx:xxx:xx:xxx:cmac:1.0">
    <CMAC_protocol_version>1.0</CMAC_protocol_version>
<CMAC_sending_alert_gateway_id>http://cmas_federal_alert_gateway_uri
    </CMAC_sending_alert_gateway_id >
    <CMAC_message_identifier>1056</CMAC_message_identifier>
    <CMAC_sent_date_time>2008-06-
    25T14:50:05-07:00</CMAC_sent_date_time>
    <CMAC_status>System</CMAC_status>
    <CMAC_message_type>Error</CMAC_message_type>
    <CMAC_note>CMAC_Error_300</CMAC_note>
</CMAC_Alert_Attributes>
```

The alert gateway 120 may use the foregoing message to indicate an error due to insufficient storage on the alert gateway 120.

The CMSP gateway 122 may have the option of receiving additional information from the alert gateway 120. This additional information may include the original CAP message that the alert gateway 120 used to create the CMAM. In the event the CMSP gateway 122 is unable to retrieve this additional information, an error message may be sent by the CMSP gateway 122 to the alert gateway 120 to indicate the failure to retrieve this additional information.

The error message is a separate message from the acknowledgement of an alert, update or cancel message sent by the CMSP gateway 122 to the alert gateway 120, and may be sent upon failure to retrieve additional information associated with the alert, update or cancel message. Thus, this error indication is generally not an indication of an error with the original alert, update, or cancel message.

When the CMSP gateway 122 is unable to retrieve the additional information from the alert gateway 120 using the URI specified either by the CMAC_original_cap_alert_uri or in the CMAC resource segment 308 in the original alert, update or cancel message, the CMSP gateway 122 may send a CMAC message to the alert gateway 120 indicating its inability to retrieve the additional information. The CMAC message may only include a CMAC alert attributes segment 302. Upon receipt of this error indication, the alert gateway 120 may log the error. Table XIV below summarizes the particular CMAC elements 206 that may be used for a CMSP gateway error indication of upon failure to retrieve additional information.

TABLE XIV

| CMAC Element | Value |
| --- | --- |
| CMAC_protocol_version | Version of the CMAC protocol |
| CMAC_sending_alert_gateway_id | CMSP Gateway identifier |
| CMAC_message_identifier | The identifier value contained in the Alert, Update or Cancel message received from the Alert Gateway for which the additional information retrieval was attempted |
| CMAC_sent_date_time | Date and time the error indication is sent by the CMSP Gateway |
| CMAC_status | Value of "System" |
| CMAC_message_type | Value of "Error" |
| CMAC_note | CMAC_Error_200 and any additional CMAC Response Code Values |

The following is an exemplary format of an error message for failure to retrieve additional information that may be sent from the CMSP gateway 122 to the alert gateway 120:

```
<?xml version = "1.0" encoding = "UTF-8"?>
<CMAS_Alert_Attributes xmlns = "urn:xxx:xxx:xx:xxx:cmac:1.0">
    <CMAC_protocol_version>1.0</CMAC_protocol_version>
<CMAC_sending_alert_gateway_id>http://
cmas_federal_alert_gateway_uri
    </CMAC_sending_alert_gateway_id >
        <CMAC_message_identifier>1056</CMAC_message_identifier>
        <CMAC_sent_date_time>2008-06-
25T14:50:05-07:00</CMAC_sent_date_time>
        <CMAC_status>System</CMAC_status>
        <CMAC_message_type>Error</CMAC_message_type>
        <CMAC_note>CMAC_Error_200</CMAC_note>
</CMAS_Alert_Attributes>
```

The CMSP gateway 122 may be configured to inform the alert gateway 120 of maintenance or other error situations during which period the CMSP gateway 122 cannot receive any messages from the alert gateway 120. This action may be requested via an error response code as a result of a keep alive message being received by the alert gateway 120. In addition, the CMSP gateway 122 may also request transmissions be ceased via a maintenance command on the CMSP gateway 122 or internal error processing, whereby the CMSP gateway 122 may be configured to initiate a message to the alert gateway 120 to cease transmissions. All transmissions, including the keep alive message, may be stopped as a result of this command.

Upon a maintenance command or other error condition at the CMSP gateway 122, the CMSP gateway 122 may issue a transmission control message to the alert gateway 120 via the CMAS interface 130 to cease message traffic destined for the CMSP gateway 122. The transmission control message may be a CMAC message that only includes the CMAC alert attributes segment 302. The transmission control message may be indicated by a CMAC_status element value of "System" and a CMAC_message_type element value of "Error," with the CMAC_note element indicating "CMAC_Resp_500" for a transient error on the CMSP gateway 122 with a request to discontinue transmission of alerts. The CMSP gateway 122 may indicate the time the message was initiated in the CMAC_sent_date_time element. The CMSP gateway 122 may assign a unique message identifier to the transmission control message that is specified in the CMAC_message_identifier element. Table XV below summarizes the particular CMAC elements 206 that may be used for a CMSP gateway-initiated transmission control message that ceases transmissions from the alert gateway 120.

TABLE XV

| CMAC Element | Value |
| --- | --- |
| CMAC_protocol_version | Version of the CMAC protocol |
| CMAC_sending_alert_gateway_id | CMSP Gateway identifier |
| CMAC_message_identifier | Unique message identifier assigned by the CMSP Gateway |
| CMAC_sent_date_time | Date and time the Transmission Control message is sent by the CMSP Gateway |
| CMAC_status | Value of "System" |
| CMAC_message_type | Value of "Error" |
| CMAC_note | Value of "CMAC_Resp_500" Transient error on CMSP Gateway - Discontinue transmission of alerts |

The following is an exemplary format for a transmission control message, initiated from the CMSP gateway 122 and sent to the alert gateway 120, that ceases transmissions:

```
<?xml version = "1.0" encoding = "UTF-8"?>
<CMAS_Alert_Attributes xmlns = "urn:xxx:xxx:xx:xxx:cmac:1.0">
    <CMAC_protocol_version>1.0</CMAC_protocol_version>
<CMAC_sending_alert_gateway_id>http://cmas_cmsp_gateway_uri
    </CMAC_sending_alert_gateway_id >
        <CMAC_message_identifier>1056</CMAC_message_identifier>
        <CMAC_sent_date_time>2008-06-
25T14:50:00-07:00</CMAC_sent_date_time>
```

```
    <CMAC_status>System</CMAC_status>
    <CMAC_message_type>Error</CMAC_message_type>
    <CMAC_message_type>CMAC_Resp_500</
    CMAC_message_type>
</CMAC_Alert_Attributes>
```

After the maintenance or error condition is cleared, the CMSP gateway 122 may inform the alert gateway 120 that the transmission of messages may resume using a transmission control message indicated by a CMAC_status element value of "System," a CMAC_message_type element value of "Error," and a CMAC_note element indicating "CMAC_Resp_501" to resume transmission of alerts to CMSP gateway 122. The CMSP gateway 122 may indicate the time the message was initiated in the CMAC_sent_date_time element. The CMSP gateway 122 may use the same unique message identifier in the transmission control message as was used in the original message to cease transmissions (either the transmission control message or the response to the keep alive message). The unique message identifier may be specified in the CMAC_message_identifier element. Table XVI below summarizes the particular CMAC elements 206 that may be used for a CMSP gateway-initiated transmission control message that resumes transmissions.

TABLE XVI

| CMAC Element | Value |
| --- | --- |
| CMAC_protocol_version | Version of the CMAC protocol |
| CMAC_sending_alert_gateway_id | CMSP Gateway identifier |
| CMAC_message_identifier | The message identifier of the original message used to cease transmissions (either a Transmission Control message or a Keep Alive response message). |
| CMAC_sent_date_time | Date and time the Transmission Control message is sent by the CMSP Gateway |
| CMAC_status | Value of "System" |
| CMAC_message_type | Value of "Error" |
| CMAC_note | Value of "CMAC_Resp_501" Resume transmission of alerts to CMSP Gateway |

The following is an exemplary format for a transmission control message, initiated from the CMSP gateway 122 and sent to the alert gateway 120, that resumes transmissions:

```
<?xml version = "1.0" encoding = "UTF-8"?>
<CMAS_Alert_Attributes xmlns = "urn:xxx:xxx:xx:xxx:cmac:1.0">
    <CMAC_protocol_version>1.0</CMAC_protocol_version>
<CMAC_sending_alert_gateway_id>http://cmas_cmsp_gateway_uri
    </CMAC_sending_alert_gateway_id >
    <CMAC_message_identifier>1056</CMAC_message_identifier>
    <CMAC_sent_date_time>2008-06-
    25T14:55:00-07:00</CMAC_sent_date_time>
    <CMAC_status>System</CMAC_status>
    <CMAC_message_type>Error</CMAC_message_type>
    <CMAC_message_type>CMAC_Resp_501</
    CMAC_message_type>
</CMAC_Alert_Attributes>
```

Exemplary Communications Between the Alert Gateway and the CMSP Gateway

Figure 4A:
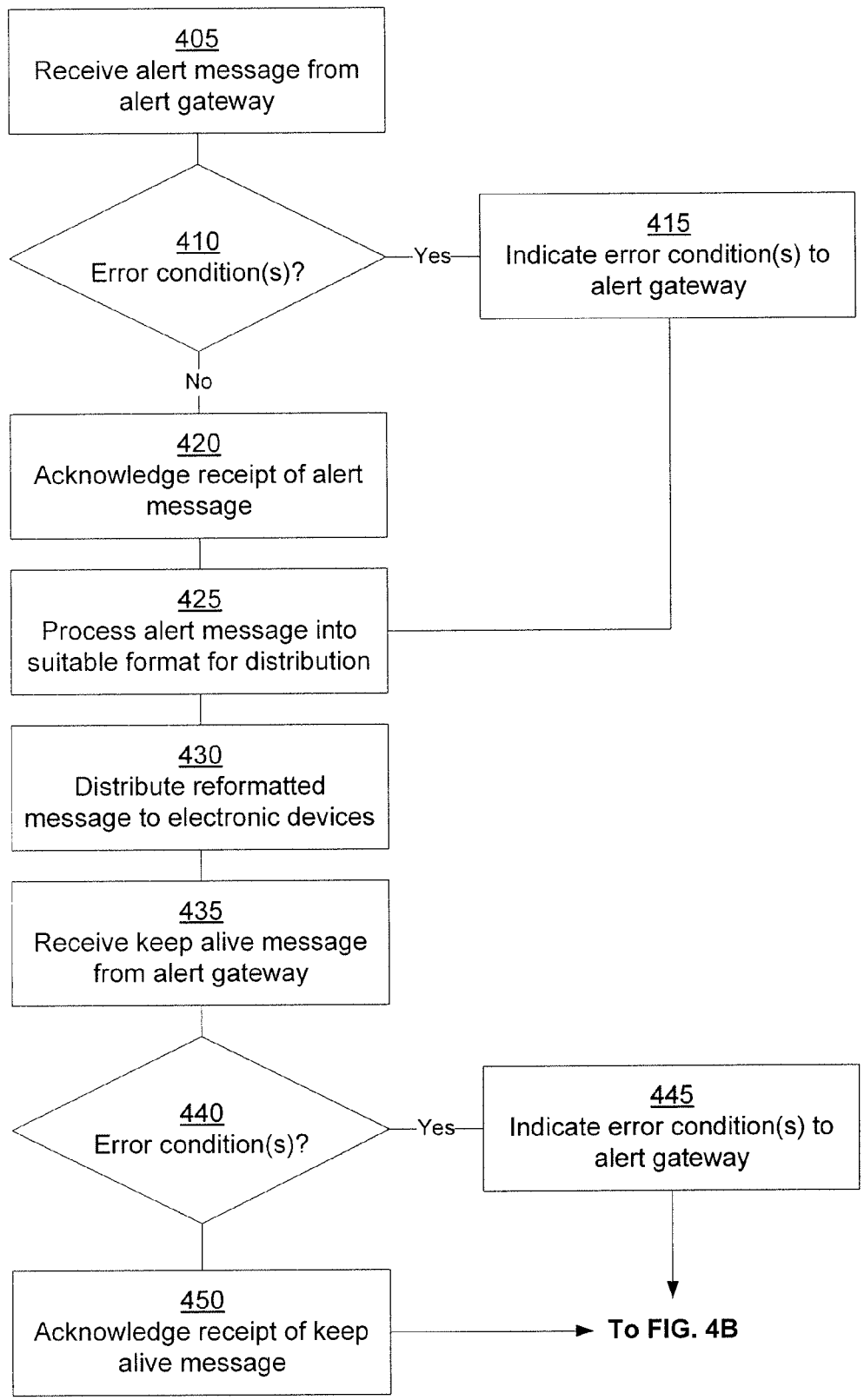
FIGS. 4A and 4B are flow diagrams of an exemplary method for communicating with an alert gateway.
Figure 4B:
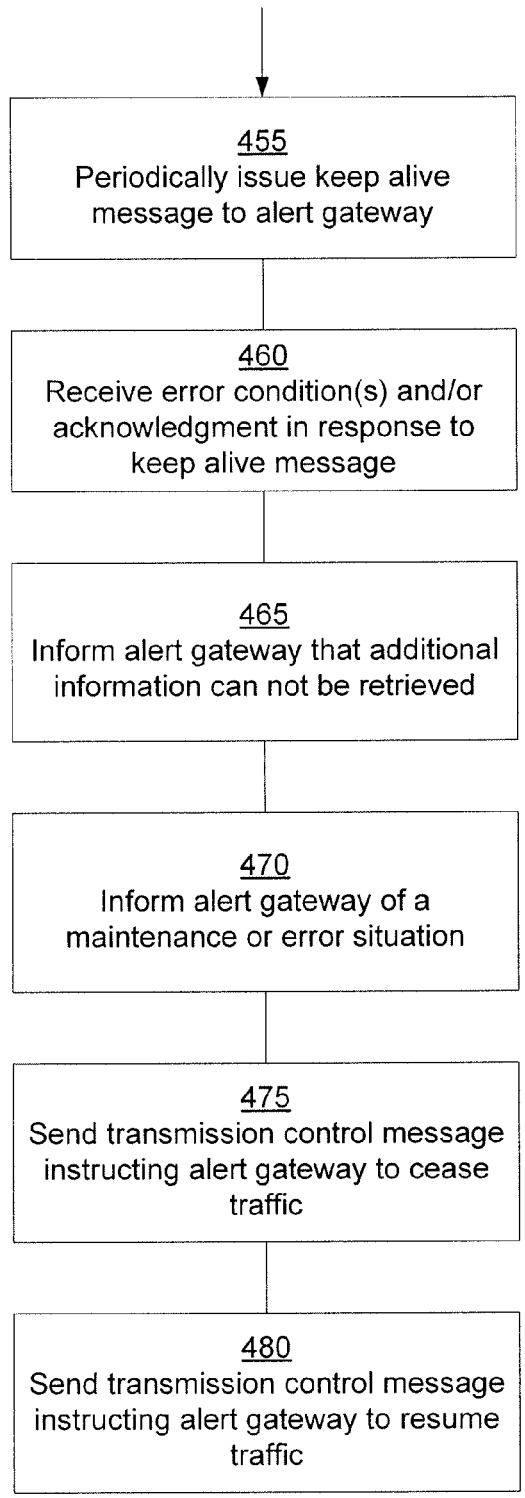

FIGS. 4A and 4B are flow diagrams of an exemplary method 400 for communicating with an alert gateway 120 (from the perspective of the CMSP gateway 122). At 405, the CMSP gateway 122 may receive an alert message from the alert gateway 120. The alert message may be in the format of a CMAC message. At 410, the CMSP gateway 122 may determine whether there is an error condition associated with the CMSP gateway 122 itself and/or with the message received from the alert gateway 120. For example, the CMSP gateway 122 may determine that it has insufficient storage to store messages from the alert gateway 120. Alternatively, the CMSP gateway 122 may determine that the message was received after the expiration time of the alert message, i.e., after the time period specified in the alert message had expired.

If the CMSP gateway 122 determines that there is an error condition, the CMSP gateway 122 may send a CMAC error message to the alert gateway 120 at 415. The CMAC error message may include one or more CMAC elements 206, as illustrated in Table X above, for example. In the absence of an error condition, the CMSP gateway 122 may acknowledge receipt of the alert message at 420. For example, the CMSP gateway 122 may send a CMAC acknowledgment message to the alert gateway 120. The CMAC acknowledgment message may include one or more CMAC elements 206, as illustrated in Table IX above, for example.

At 425, the CMSP gateway 122 may process the alert message, using the CMAS interface 130, into a suitable format for distribution to various electronic devices, such as communications devices 100a, 100b, 100c. For example, the CMSP gateway 122 may process the alert message into a CMAE message. An exemplary scheme for mapping CMAC elements to CMAE elements is shown in Appendix II. At 430, the CMSP gateway 122 may send the reformatted alert message to the wireless network 108 for distribution to the communications devices 100a, 100b, 100c, for example.

As noted above, the CMAS interface 130 may facilitate the exchange of various messages between the CMSP gateway 122 and the alert gateway 120. Thus, at 435, the CMSP gateway 122 may receive a keep alive message from the alert gateway 120. The keep alive message from the alert gateway 120 may include one or more CMAC elements 206, as illustrated in Table VI above, for example. At 440, the CMSP gateway 122 may then determine whether there is an error condition associated with the CMSP gateway 122 itself and/or with the keep alive message. If the CMSP gateway 122 determines that an error condition exists (e.g., there is insufficient storage space at the CMSP gateway 122), the CMSP gateway 122 may indicate the error condition to the alert gateway 120 at 445. For example, the CMSP gateway 122 may send a CMAC error message to the alert gateway 120. The CMAC error message may include one or more CMAC elements 206, as illustrated in Table VIII above, for example. In the absence of an error condition, the CMSP gateway 122 may acknowledge receipt of the keep alive message at 450. For example, the CMSP gateway 122 may send a CMAC acknowledgement message to the alert gateway 120. The CMAC acknowledgment message may include one or more CMAC elements 206, as illustrated in Table VII above, for example.

Continuing with FIG. 4B, the CMSP gateway 122 may send other types of messages to the alert gateway. For example, at 455, the CMSP gateway 122 may send a keep alive message to the alert gateway 120. The keep alive message from the CMSP gateway 122 may be a CMAC message having one or more CMAC elements 206, as illustrated in Table XI above, for example. At 460, the CMSP gateway 122 may receive an indication of an error condition and/or an acknowledgment from the alert gateway 120 in response to the keep alive message. For example, the CMSP gateway 122 may receive a CMAC error message having one or more CMAC elements 206, as illustrated in Table XIII above. Alternatively, the CMSP gateway 122 may receive a CMAC acknowledgment message having one or more CMAC elements 206, as illustrated in Table XII. At 465, the CMSP gateway 122 may inform the alert gateway 120 that it is unable to retrieve additional information from the alert gateway 120. For example, the CMSP gateway 122 may send a CMAC message having one or more CMAC elements 206, as illustrated in Table XIV above.

In some situations, the CMSP gateway 122 may be unable to receive or exchange message traffic with the alert gateway 120. For example, at 470, the CMSP gateway 122 may inform the alert gateway 120 of a maintenance and/or error situation. In such instances, at 475, the CMSP gateway 122 may send the alert gateway 120 a transmission control message instructing the alert gateway 120 to cease message traffic to the CMSP gateway 122. The transmission control message may include on or more CMAC elements 206, as illustrated in Table XV above, for example. After the maintenance is complete, or the error situation has been addressed, the CMSP gateway 122 may send the alert gateway 120 another transmission control message instructing the alert gateway 120 to resume message traffic to the CMSP gateway 122. This transmission control message may include one or more CMAC elements 206, as illustrated in Table XVI above, for example.

It will be appreciated that one or more of the elements depicted in FIGS. 4A and 4B may be omitted from the method 400 while remaining consistent with an embodiment. In addition, the sequence of the elements depicted in FIGS. 4A and 4B are for illustrative purposes only. Thus, other suitable sequences are also consistent with an embodiment. For example, the CMSP gateway 122 may inform the alert gateway 120 of a maintenance or error situation, as depicted at 470, prior to issuing a keep alive message to the alert gateway 120, as depicted at 455.

Figure 5A:
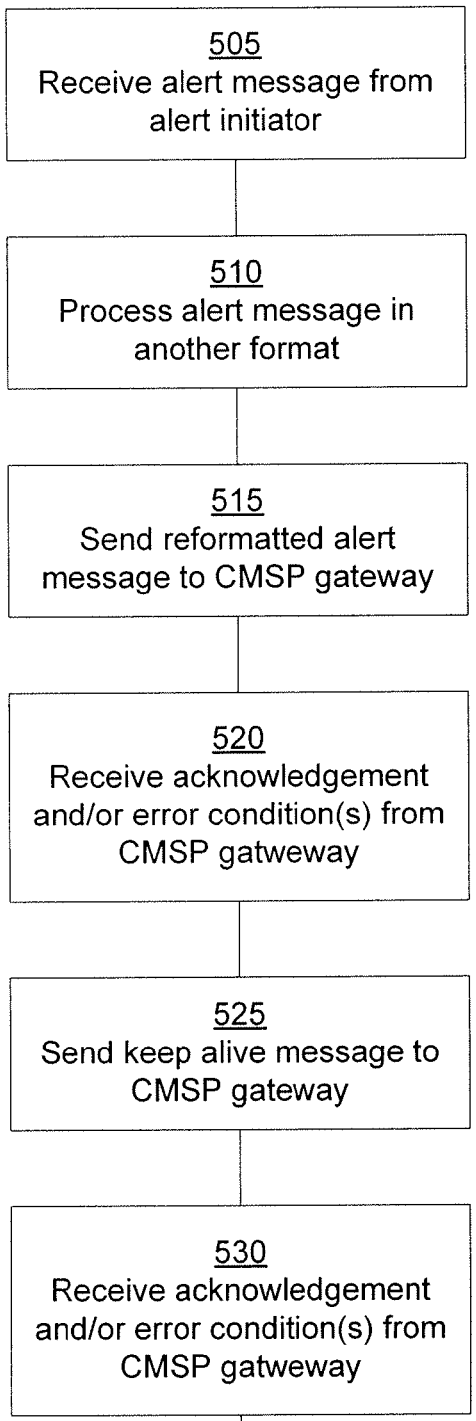
FIG. 5A-5C are flow diagrams of an exemplary method for communicating with an alert initiator and a commercial mobile service provider (CMSP) gateway.
Figure 5B:
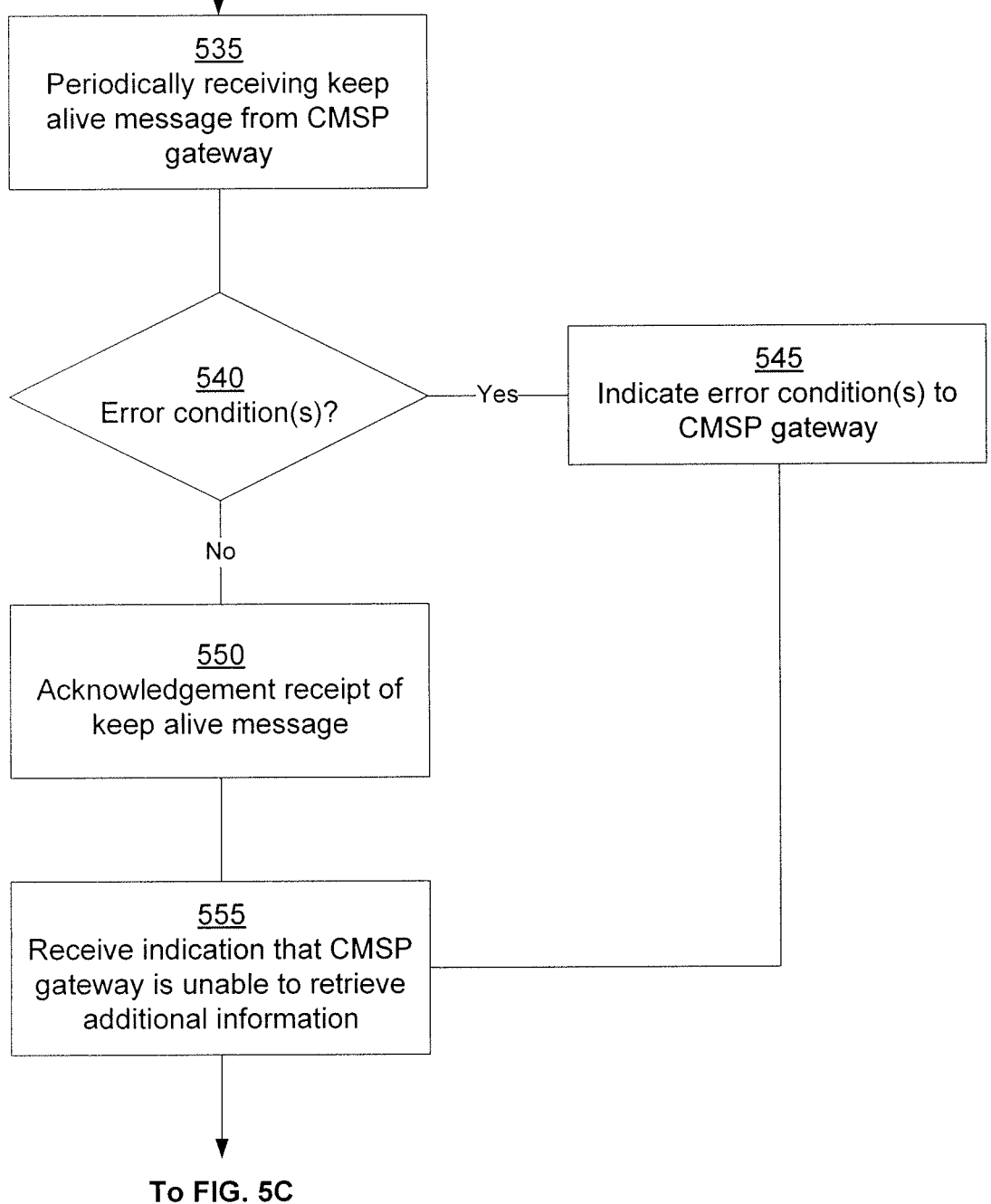
Figure 5C:
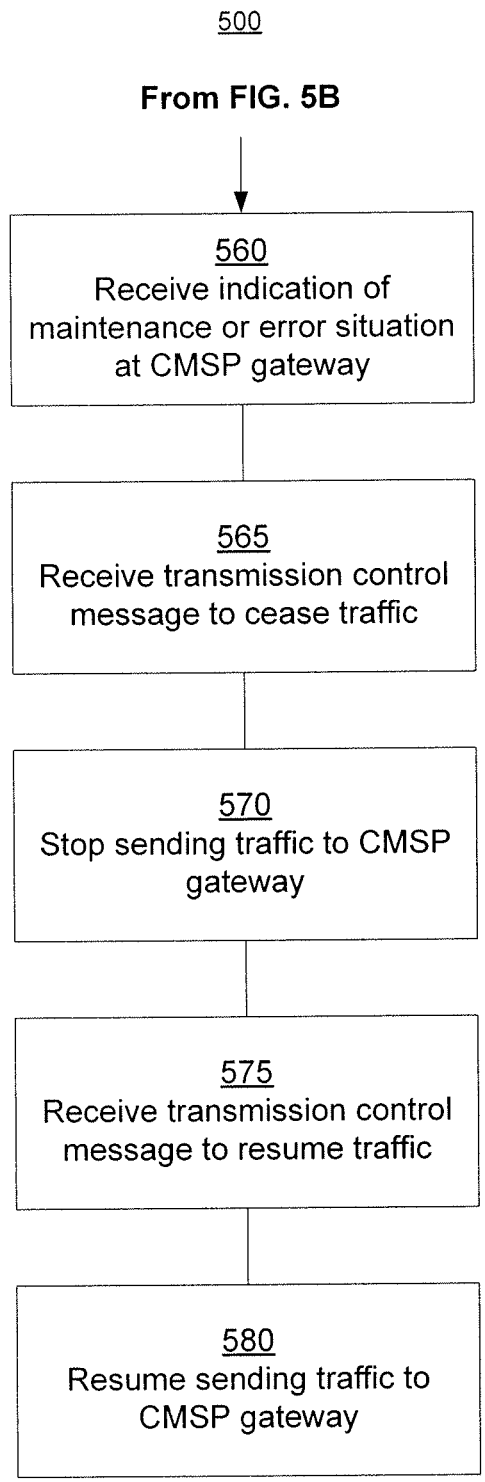

FIGS. 5A-5C are flow diagrams of an exemplary method 500 for communicating with an alert initiator 116 and the CMSP gateway 122 (from the perspective of the alert gateway 120). At 505, the alert gateway 120 may receive an alert message from the alert initiator 116. In one embodiment, the alert message from the alert initiator 116 may be in a CAP format. At 510, the alert gateway 120 may process the alert message, using the CMAS interface 130, into a suitable format for distribution to the CMSP gateway 122. For example, the alert gateway 120 may process the alert message into a CMAC message. An exemplary scheme for mapping CAP elements to CMAC elements is shown in Appendix II. At 515, the alert gateway 120 may send the reformatted alert message to the CMSP gateway 122. In response, at 520, the alert gateway may receive a acknowledgment (e.g., a message having one or more CMAC elements 206 shown in Table IX above) and/or an error indication (e.g., a message having one or more CMAC elements 206 shown in Table X above) from the CMSP gateway 122.

As noted above, the CMAS interface 130 may facilitate the exchange of various types of messages between the alert gateway 120 and the CMSP gateway 122. For example, at 525, the alert gateway 120 may send a keep alive message to the CMSP gateway 122. The keep alive message may include one or more CMAC elements 206, as illustrated in Table VI above, for example. After the keep alive message is sent, the alert gateway 120 may receive an acknowledgement and/or one or more error conditions from the CMSP gateway 122 at 530 in response to the keep alive message. The acknowledgement from the CMSP gateway 122 may include one or more CMAC elements 206, as illustrated in Table VII above, for example. The error condition(s) indicated by the CMSP gateway 122 may include one or more CMAC elements 206, as illustrated in Table VIII above, for example.

Continuing with FIG. 5B, at 535, the alert gateway 120 may also periodically receive keep alive messages from the CMSP gateway 122. In response to the keep alive message from the CMSP gateway 122, the alert gateway 120 may determine whether there is one or more error conditions at 540 (e.g., the alert gateway 120 may determine if it has insufficient storage). If the alert gateway 120 determines that there is an error condition, the alert gateway 120 may indicate the error condition to the CMSP gateway 122 at 545. The error condition indicated by the alert gateway 120 may include one or more CMAC elements 206, as illustrated in Table XIII above, for example. In the absence of an error condition, the alert gateway 120 may send an acknowledgement to the CMSP gateway 122 that the keep alive was message received at 550. The acknowledgment from the alert gateway 120 may include one or more CMAC elements 206, as illustrated in Table XII above, for example. At 555, the alert gateway 120 may receive an indication that the CMSP gateway 122 is unable to retrieve additional information from the alert gateway 120. The indication that the CMSP gateway 122 is unable to retrieve additional information may be a CMAC message having one or more CMAC elements 206, as illustrated in Table XIV above, for example.

Continuing with FIG. 5C, the alert gateway 120 may receive an indication from the CMSP gateway 122 of a maintenance and/or error situation at 560. In such instances, at 565, the alert gateway 120 may receive a transmission control message from the CMSP gateway 122 instructing the alert gateway 120 to cease message traffic to the CMSP gateway 122. The transmission control message may include on or more CMAC elements 206, as illustrated in Table XV above, for example. In response to the transmission control message at 565, the alert gateway 120 may stop sending message traffic to the CMSP gateway 122 at 570. After the maintenance is complete, or the error situation has been addressed, the alert gateway 120 may receive another transmission control message from the CMSP gateway 122 instructing the alert gateway 120 to resume message traffic at 575. This transmission control message may include one or more CMAC elements 206, as illustrated in Table XVI above, for example. In response to the transmission control message at 575, the alert gateway 120 may resume sending message traffic to the CMSP gateway 122 at 580.

It will be appreciated that one or more of the elements depicted in FIGS. 5A-5C may be omitted from the method 500 while remaining consistent with an embodiment. In addition, the sequence of the elements depicted in FIGS. 5A-5C are for illustrative purposes only. Thus, other suitable sequences are also consistent with an embodiment. For example, the alert gateway 120 may receive a keep alive message from the CMSP gateway 122, as depicted at 535, prior to sending a keep alive message to the CMSP gateway 122, as depicted at 525.

Description of an Exemplary Wireless Network

Figure 6:
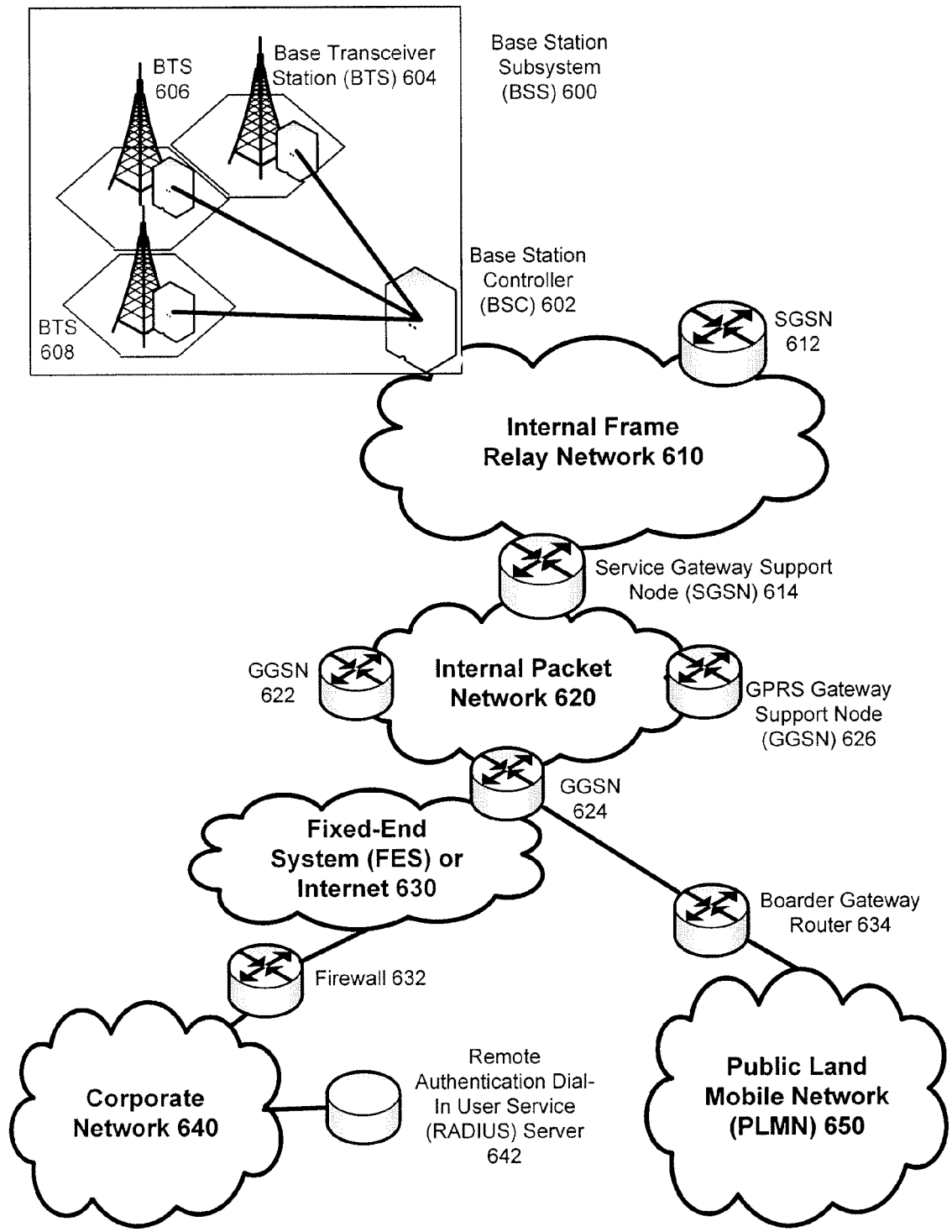
FIG. 6 is a diagram of an exemplary packet-based mobile cellular network environment, such as a GPRS network, in which aspects of one or more embodiments may be implemented.

FIG. 6 depicts an overall block diagram of an exemplary packet-based mobile cellular network environment, such as a GPRS network, in which aspects of one or more embodiments may be implemented. In an example configuration, the wireless network 108 may be encompassed by the network environment depicted in FIG. 6. In such an environment, there may be a plurality of Base Station Subsystems ("BSS") 600 (only one is shown), each of which comprises a Base Station Controller ("BSC") 602 serving a plurality of Base Transceiver Stations ("BTS"), such as BTSs 604, 606, and 608. The BTSs 604, 606, 608 are the access points where users of packet-based mobile devices (e.g., the communications device 100) become connected to the wireless network 108.

In exemplary fashion, the packet traffic originating from one or more user devices (e.g., the communication device 100) may be transported via an over-the-air interface to the BTS 608, and from the BTS 608 to the BSC 602. Base station subsystems, such as the BSS 600, may be part of an internal frame relay network 610 that may include a Service GPRS Support Nodes ("SGSN") such as SGSNs 612, 614. As shown in FIG. 6, the SGSN 614 may be connected to an internal packet network 620 through which the SGSN 614 may route data packets to and from a plurality of gateway GPRS support nodes (GGSNs), such as GGSNs 622, 624, 626. As illustrated, the SGSN 614 and the GGSNs 622, 624, 626 may be part of the internal packet network 420. The GGSNs 622, 624, 626 typically provide an interface to external Internet Protocol ("IP") networks such as a Public Land Mobile Network ("PLMN") 650, corporate intranets 640, or a Fixed-End System ("FES") or the public Internet 630. As illustrated, a corporate network 640 may be connected to the GGSN 624 via a firewall 632 and the PLMN 650 may be connected to the GGSN 624 via a boarder gateway router 634. A Remote Authentication Dial-In User Service ("RADIUS") server 642 may be used for caller authentication when a user of a mobile cellular device, such as communications device 100, calls the corporate network 640.

Generally, there may be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells may be cells whose antenna height is under average roof top level. Micro-cells may typically be used in urban areas. Pico cells may include small cells having a diameter of a few dozen meters. Pico cells may be used mainly indoors. On the other hand, umbrella cells may be used to cover shadowed regions of smaller cells and/or fill in gaps in coverage between those cells.

Figure 7:
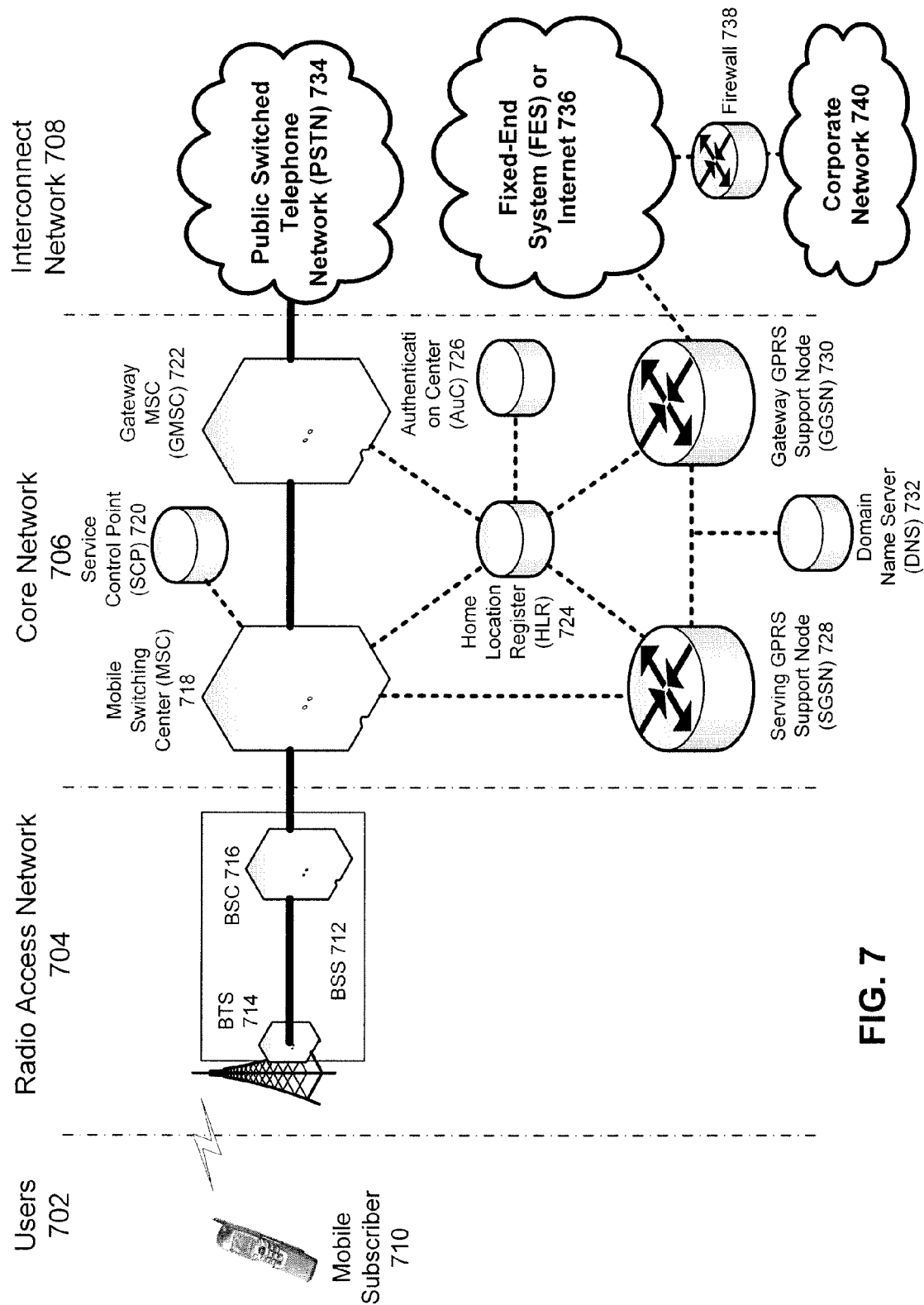
FIG. 7 is a diagram of an exemplary architecture of a GPRS network segmented into four groups.

FIG. 7 illustrates an architecture of a typical GPRS network as segmented into four groups: users 702, a radio access network 704, a core network 706, and an interconnect network 708. In an example configuration, the wireless network 108, shown in FIG. 1, may include the core network 706. The users 702 may include a plurality of end users (though only a single mobile subscriber 710 is shown in FIG. 7). In an example embodiment, the device depicted as the mobile subscriber 710 may include the communications device 100.

The radio access network 704 may include a plurality of BSSs, such as a BSS 712, which may include a BTS 714 and a BSC 716. The core network 706 may have a host of various network elements. As shown in FIG. 7, the core network 706 may have a Mobile Switching Center ("MSC") 718, a Service Control Point ("SCP") 720, a gateway MSC 722, a SGSN 728, a Home Location Register ("HLR") 724, an Authentication Center ("AuC") 726, a Domain Name Server ("DNS") 732, and a GGSN 730. The interconnect network 708 may also include a host of various networks and network elements. For example, the interconnect network 708 may include a Public Switched Telephone Network ("PSTN") 734, a Fixed-End System ("FES") or Internet 736, a firewall 738, and a corporate network 740.

The MSC 718 may be connected to a large number of BSCs. At the MSC 718, for instance, depending on the type of traffic, the traffic may be separated in that voice may be sent to the PSTN 734 through the GMSC 722, and/or data may be sent to the SGSN 728, which then sends the data traffic to the GGSN 730 for further forwarding.

When the MSC 718 receives call traffic, for example, from the BSC 712, the MSC 718 may send a query to a database hosted by the SCP 720. The SCP 720 may process the request and issues a response to the MSC 718 so that the MSC 718 may continue call processing as appropriate.

The HLR 724 often is a centralized database for subscribers to register to the GPRS network. The HLR 724 may store static information about each subscriber, such as the International Mobile Subscriber Identity ("IMSI"), subscribed services, and a key for authentication. The HLR 724 may also store dynamic subscriber information such as the subscriber's current location. Associated with the HLR 724 is the AuC 726. The AuC 726 may be a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the communications device 100, used by an end user of the mobile cellular service. When a mobile subscriber turns on his or her communications device 100, the device 100 typically goes through an attach process by which the device 100 attaches to a SGSN of the GPRS network, such as the SGSN 728 shown in FIG. 7. When mobile subscriber 710 initiates the attach process by turning on the network capabilities of the communications device, an attach request may be sent by the device 100 to the SGSN 728. The SGSN 728 may then query another SGSN (not shown), to which the mobile subscriber 710 was attached before, for the identity of the mobile subscriber 710. Upon receiving the identity of the mobile subscriber 710 from the other SGSN, the SGSN 728 may request more information from the mobile subscriber 710. This information is used to authenticate the mobile subscriber 710 to the SGSN 728 by the HLR 724. Once verified, the SGSN 728 may send a location update to the HLR 724 indicating the change of location to a new SGSN, in this case the SGSN 728. The HLR 724 may notify the old SGSN, to which mobile subscriber 710 was attached before, to cancel the location process for the mobile subscriber 710. The HLR 724 may then notify the SGSN 728 that the location update has been performed. At this time, the SGSN 728 may send an Attach Accept message to the communications device 100 associated with the mobile subscriber 710. The communications device 100 may send an Attach Complete message to the SGSN 728.

After attaching itself with the network, the mobile subscriber 710 may then go through the authentication process. In the authentication process, the SGSN 728 may send the authentication information to the HLR 724, which may send information back to the SGSN 728 based on the subscriber's profile that was part of the subscriber's initial setup. The SGSN 728 may then send a request for authentication and ciphering to the communications device 100 associated with the mobile subscriber 710. The communications device 100 may use an algorithm to send the user identification (ID) and password to the SGSN 728. The SGSN 728 may use the same algorithm and compare the result. If a match occurs, the SGSN 728 typically authenticates the mobile subscriber 710.

Next, the communications device 100 may establish a user session with the destination network, such as the corporate network 740, by going through a Packet Data Protocol ("PDP") activation process. Briefly, in the process, the communications device 100 may request access to an Access Point Name ("APN"), such as UPS.com. The SGSN 728 may receive the activation request from the communications device 100. The SGSN 728 may then initiate a Domain Name Service ("DNS") query to learn which GGSN node has access to the UPS.com APN. The DNS query may be sent to the DNS server 732 in the core network 706, which may be provisioned to map to one or more GGSN nodes in the core network 706. Based on the APN, the mapped GGSN 730 may access the requested corporate network 740. The SGSN 728 may then send to the GGSN 730 a Create Packet Data Protocol ("PDP") Context Request message that contains necessary information. The GGSN 730 may send a Create PDP Context Response message to the SGSN 728, which may then send an Activate PDP Context Accept message to the communications device 100 associated with the mobile subscriber 710.

Once activated, data packets of the call made by the mobile subscriber 710 may then go through the radio access network 704, the core network 706, and the interconnect network 708, in the particular fixed-end system or Internet 736 and the firewall 738 to reach corporate network 740.

Thus, network elements that can invoke the functionality of sending and/or receiving EAS messages and alerts may include, but are not limited to, Gateway GPRS Support Node tables, Fixed End System router tables, firewall systems, VPN tunnels, and any number of other network elements as required by the particular digital network.

While example embodiments have been described in connection with various computing devices, the underlying concepts can be applied to any computing device or system capable of processing EAS alerts. The various techniques described herein can be implemented in connection with hardware or software or, where appropriate, with a combination of both. Thus, the methods and apparatus for implementing aspects of one or more embodiments may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for selectively processing a broadcast message. In the case of program code execution on programmable computers, the computing device will generally include a processor, a storage medium readable by the processor (including volatile and non-volatile memory and/or storage elements), at least one input device, and at least one output device. The program(s) may be implemented in assembly or machine language, if desired. In any case, the language may be a compiled or interpreted language, and combined with hardware implementations.

The methods and apparatus for the methods and apparatus for implementing aspects of one or more embodiments may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for selectively processing a broadcast message. When implemented on a general-purpose processor, the program code combines with the processor to provide a unique apparatus that operates to process EAS alerts. Additionally, any storage techniques used in connection with processing EAS alerts can invariably be a combination of hardware and software.

While the disclosed embodiments have been described in connection with the various figures, it is to be understood that other similar embodiments can be used or modifications and additions can be made to the disclosed embodiments for performing the same function(s) without deviating therefrom. For example, one skilled in the art will recognize that various instructions, not specifically disclosed herein, for interfacing an alert gateway to a CMSP gateway may be utilized. Further, one skilled in the art will recognize that the embodiments disclosed herein may apply to any environment, whether wired or wireless, and may be applied to any number of devices connected via a communications network and interacting across the network. Therefore, the embodiments should be construed in breadth and scope in accordance with the appended claims.

APPENDIX I

```
<?xml version = "1.0" encoding = "UTF-8"?>
<schema xmlns = "http://www.w3.org/2001/XMLSchema"
    targetNamespace = "cmac:1.0"
    xmlns:cmac = "cmac:1.0"
    xmlns:xs = "http://www.w3.org/2001/XMLSchema"
    elementFormDefault = "qualified"
    attributeFormDefault = "unqualified">
  <element name = "CMAC_Alert_Attributes">
    <annotation>
      <documentation>CMAC Alert Message (version 1.0)</documentation>
    </annotation>
    <complexType>
      <sequence>
        <element name = "CMAC_protocol_version" type = "string"/>
        <element name = "CMAC_sending_alert_gateway_id" type = "anyURI"/>
        <element name = "CMAC_message_identifier" type = "string"/>
        <element name = "CMAC_referenced_message_identifier" type = "string" minOccurs = "0" />
        <element name = "CMAC_special_handling">
          <simpleType>
            <restriction base = "string">
              <enumeration value = "Presidential"/>
```

APPENDIX I-continued

```
            <enumeration value = "Child Abduction"/>
            <enumeration value = "No Special Handling"/>
         </restriction>
      </simpleType>
   </element>
   <element name = "CMAC_sender" type = "string"/>
   <element name = "CMAC_sent_date_time" type = "dateTime"/>
   <element name = "CMAC_status">
      <simpleType>
         <restriction base = "string">
            <enumeration value = "Actual"/>
            <enumeration value = "Exercise"/>
            <enumeration value = "System"/>
            <enumeration value = "Test"/>
         </restriction>
      </simpleType>
   </element>
   <element name = "CMAC_message_type">
      <simpleType>
         <restriction base = "string">
            <enumeration value = "Alert"/>
            <enumeration value = "Update"/>
            <enumeration value = "Cancel"/>
            <enumeration value = "Ack"/>
            <enumeration value = "Error"/>
         </restriction>
      </simpleType>
   <element name = "CMAC_cancel_error_note" type = "string" minOccurs = "0"/>
   <element name = "CMAC_original_cap_alert_uri" type = "anyURI"/>
</element>
<element name = "CMAC_alert_info" minOccurs = "0">
   <complexType>
      <sequence>
         <element name = "category" maxOccurs = "unbounded">
            <simpleType>
               <restriction base = "string">
                  <enumeration value = "Geo"/>
                  <enumeration value = "Met"/>
                  <enumeration value = "Safety"/>
                  <enumeration value = "Security"/>
                  <enumeration value = "Rescue"/>
                  <enumeration value = "Fire"/>
                  <enumeration value = "Health"/>
                  <enumeration value = "Env"/>
                  <enumeration value = "Transport"/>
                  <enumeration value = "Infra"/>
                  <enumeration value = "CBRNE"/>
                  <enumeration value = "Other"/>
               </restriction>
            </simpleType>
         </element>
         <element name = "CMAC_event_code" minOccurs = "0" maxOccurs =
         "unbounded">
            <complexType>
               <sequence>
                  <element ref = "cmac:valueName"/>
                  <element ref = "cmac:value"/>
               </sequence>
            </complexType>
         </element>
         <element name = "CMAC_responseType" maxOccurs = "unbounded">
            <simpleType>
               <restriction base = "string">
                  <enumeration value = "Shelter"/>
                  <enumeration value = "Evacuate"/>
                  <enumeration value = "Prepare"/>
                  <enumeration value = "Execute"/>
                  <enumeration value = "Monitor"/>
                  <enumeration value = "Assess"/>
                  <enumeration value = "None"/>
               </restriction>
            </simpleType>
         </element>
         <element name = "CMAC_severity">
            <simpleType>
               <restriction base = "string">
                  <enumeration value = "Extreme"/>
                  <enumeration value = "Severe"/>
               </restriction>
            </simpleType>
```

APPENDIX I-continued

```
      </element>
      <element name = "CMAC_urgency">
        <simpleType>
          <restriction base = "string">
            <enumeration value = "Immediate"/>
            <enumeration value = "Expected"/>
          </restriction>
        </simpleType>
      </element>
      <element name = "CMAC_certainty">
        <simpleType>
          <restriction base = "string">
            <enumeration value = "Observed"/>
            <enumeration value = "Likely"/>
          </restriction>
        </simpleType>
      </element>
      <element name = "CMAC_expires_date_time" type = "dateTime" minOccurs = "0"/>
      <element name = "CMAC_sender_name" type = "string" minOccurs = "0"/>
      <element name = "CMAC_text_language" />
        <simpleType>
          <restriction base = "string">
            <enumeration value = "English"/>
            <enumeration value = "Spanish"/>
            <enumeration value = "French"/>
            <enumeration value = "Other"/>
          </restriction>
        </simpleType>
      <element name = "CMAC_text_encoding" />
        <simpleType>
          <restriction base = "string">
            <enumeration value = "GSM-7 bit"/>
            <enumeration value = "ISO-639-2"/>
            <enumeration value = " UCS-2"/>
            <enumeration value = " UTF-16"/>
          </restriction>
        </simpleType>
      </element>
      <element name = "CMAC_text_alert_message_length" type = "string" />
      <element name = "CMAC_text_alert_message" type = "string" />
      <element name = "CMAC_web" type = "anyURI" minOccurs = "0"/>
      <element name = "CMAC_alert_resource" minOccurs = "0" maxOccurs = "unbounded" >
        <complexType>
          <sequence>
            <element name = "CMAC_resource_desciption" type = "string"/>
            <element name = "CMAC_mime_type" type = "string" minOccurs = "0"/>
            <element name = "CMAC_resource_size" type = "integer" minOccurs = "0"/>
            <element name = "CMAC_resource_uri" type = "anyURI" minOccurs = "0"/>
            <element name = "CMAC_digest" type = "string" minOccurs = "0"/>
          </sequence>
        </complexType>
      </element>
      <element name = "area" minOccurs = "0" maxOccurs = "unbounded">
        <complexType>
          <sequence>
            <element name = "CMAC_area_description" type = "string"/>
            <element name = "CMAC_polygon" type = "string" minOccurs = "0"
              maxOccurs = "unbounded"/>
            <element name = "CMAC_circle" type = "string" minOccurs = "0" maxOccurs
              = "unbounded"/>
            <element name = "CMAC_cmac_geocode" type="string" maxOccurs =
              "unbounded">
            <element name = "CMAC_gnis" type = "string" minOccurs = "0" maxOccurs =
              "unbounded"/>
            </element>
          </sequence>
        </complexType>
      </element>
    </sequence>
  </complexType>
  </element>
  <sequence>
</complexType>
</element>
<element name = "valueName" type = "string"/>
<element name = "value" type = "string"/>
</schema>
```

APPENDIX II

| CAP Element | CMAC Element | CMAE Element |
|---|---|---|
| N/A | CMAC_protocol_version | N/A |
| N/A | N/A | CMAE_protocol_version |
| N/A | CMAC_sending_alert_gateway_id | N/A |
| identifier | CMAC_message_identifier | CMAE_identifier |
| references | CMAC_referenced_message_identifier | N/A |
| N/A | CMAC_special_handling | CMAE_alert_handling |
| sender | CMAC_sender | N/A |
| sent | CMAC_sent_date_time | N/A |
| status | CMAC_status | N/A |
| msgType | CMAC_message_type | CMAE_alert_type |
| source | N/A | N/A |
| scope | N/A | N/A |
| restriction | N/A | N/A |
| code | N/A | N/A |
| note | CMAC_cancel_error_note | N/A |
| incidents | N/A | N/A |
| N/A | CMAC_original_cap_alert_uri | N/A |
| category | CMAC_category | CMAE_category |
| event | N/A | N/A |
| eventCode | CMAC_event_code | N/A |
| responseType | CMAC_response_type | CMAE_response_type |
| severity | CMAC_severity | CMAE_severity |
| urgency | CMAC_urgency | CMAE_urgency |
| certainty | CMAC_certainty | CMAE_certainty |
| audience | N/A | N/A |
| effective | N/A | N/A |
| onset | N/A | N/A |
| expires | CMAC_expires_date_time | CMAE_expires |
| senderName | CMAC_sender_name | N/A |
| language | CMAC_text_language | CMAE_language |
| N/A | CMAC_text_encoding | CMAE_char_set |
| N/A | CMAC_text_alert_message_length | CMAE_alert_text_length |
| N/A | CMAC_text_alert_message | CMAE_alert_text |
| headline | N/A | N/A |
| description | N/A | N/A |
| instruction | N/A | N/A |
| web | CMAC_web_link | N/A |
| contact | N/A | N/A |
| parameter | N/A | N/A |
| areaDesc | CMAC_area_description | N/A |
| polygon | CMAC_polygon | N/A |
| circle | CMAC_circle | N/A |
| geocode | CMAC_cmas_geocode | N/A |
| geocode | CMSC_gnis | N/A |
| altitude | N/A | N/A |
| ceiling | N/A | N/A |
| resourceDesc | CMAC_resource_description | N/A |
| mimeType | CMAC_mime_type | N/A |
| size | CMAC_resource_size | N/A |
| uri | CMAC_resource_uri | N/A |
| derefUri | N/A | N/A |
| digest | CMAC_digest | N/A |
| N/A | N/A | CMAE_associated_multimedia_indicator |
| N/A | N/A | CMAE_CMSP_defined_parameter |
| N/A | N/A | CMAE_reserved |

What is claimed:

1. A system comprising:
   a commercial mobile service provider (CMSP) gateway configured to communicate with an alert gateway, wherein the CMSP gateway includes a commercial mobile alert system (CMAS) interface that is configured to:
   receive an emergency alert message from the alert gateway, the emergency alert message including a plurality of elements that have been mapped from a corresponding emergency alert message issued by an alert initiator;
   process the emergency alert message into a format suitable for distribution to a plurality of electronic devices via a wireless network;
   send the emergency alert message to the wireless network for distribution to the plurality of electronic devices;
   receive, from the alert gateway, a keep alive message comprising an alert attributes segment;
   based on a status of the CMSP gateway, send a keep alive acknowledgement responsive to the keep alive message; and
   when there is insufficient storage on the CMSP gateway, send an error condition message to the alert gateway responsive to the keep alive message, the error condition message reporting an error condition.

2. The system of claim 1, wherein the emergency alert message from the alert gateway is in the format of a commercial mobile alert C interface (CMAC) message.

3. The system of claim 1, wherein the corresponding emergency alert message issued by the alert initiator is in the format of a common alerting protocol (CAP) message.

4. The system of claim 1, wherein the CMAS interface is configured to process the emergency alert message from the alert gateway into a commercial mobile alert E interface (CMAE) message.

5. The system of claim 1, wherein the CMSP gateway is configured to acknowledge receipt of the emergency alert message from the alert gateway.

6. The system of claim 1, wherein the CMSP gateway is configured to periodically issue a keep alive message to the alert gateway.

7. The system of claim 6, wherein the CMSP gateway is configured to receive at least one of a keep alive acknowledgement or an error condition message from the alert gateway in response to the keep alive message.

8. The system of claim 1, wherein the CMSP gateway is configured to send a message to the alert gateway indicating that the CMSP gateway is unable to retrieve additional information from the alert gateway.

9. The system of claim 1, wherein the CMSP gateway is configured to inform the alert gateway of at least one of a maintenance or error situation during which the CMSP gateway is unable to receive any messages from the alert gateway.

10. The system of claim 9, wherein the CMSP gateway is configured to send a first transmission control message to the alert gateway instructing the alert gateway to cease message traffic destined for the CMSP gateway.

11. The system of claim 10, wherein the CMSP gateway is configured to send a second transmission control message to the alert gateway instructing the alert gateway to resume message traffic destined for the CMSP gateway.

12. The system of claim 1, wherein the CMAS interface includes an application programming interface (API).

13. The system of claim 1, wherein the emergency alert message includes a geocode for identifying a geographical region that is to receive the emergency alert message.

14. A method comprising:
    receiving an emergency alert message from an alert gateway, the emergency alert message including a plurality of elements that have been mapped from a corresponding emergency alert message issued by an alert initiator;
    processing the emergency alert message into a format suitable for distribution to a plurality of electronic devices via a wireless network;
    sending the emergency alert message to the wireless network for distribution to the plurality of electronic devices;
    receiving, from the alert gateway, a keep alive message comprising an alert attributes segment;
    based on a status of the CMSP gateway, sending a keep alive acknowledgement responsive to the keep alive message; and
    when there is insufficient storage on the CMSP gateway, sending an error condition message to the alert gateway in response to the keep alive message, the error condition message reporting an error condition.

15. The method of claim 14, wherein the emergency alert message from the alert gateway is in the format of a commercial mobile alert C interface (CMAC) message.

16. The method of claim 14, wherein the corresponding emergency alert message issued by the alert initiator is in the format of a common alerting protocol (CAP) message.

17. The system of claim 14, wherein the CMAS interface is configured to process the emergency alert message from the alert gateway into a commercial mobile alert E interface (CMAE) message.

18. The method of claim 14, further comprising acknowledging receipt of the emergency alert message from the alert gateway.

19. The method of claim 14, further comprising periodically issuing a keep alive message to the alert gateway.

20. The method of claim 19, further comprising receiving at least one of a keep alive acknowledgement or an error condition message from the alert gateway in response to the keep alive message.

21. The method of claim 14, further comprising sending a message to the alert gateway indicating that the CMSP gateway is unable to retrieve additional information from the alert gateway.

22. The method of claim 14, further comprising informing the alert gateway of one of a maintenance or error situation during which messages can not be received from the alert gateway.

23. The method of claim 22, further comprising sending a first transmission control message to the alert gateway instructing the alert gateway to cease message traffic.

24. The method of claim 23, further comprising sending a second transmission control message to the alert gateway instructing the alert gateway to resume message traffic.

25. The method of claim 14, wherein the emergency alert message includes a geocode for identifying a geographical region that is to receive the emergency alert message.

\* \* \* \* \*